US010756945B2

(12) United States Patent
Ganesh et al.

(10) Patent No.: US 10,756,945 B2
(45) Date of Patent: Aug. 25, 2020

(54) VIRTUALIZED NETWORK MANAGEMENT PROTOCOLS

(71) Applicant: CISCO TECHNOLOGY, INC., San Jose, CA (US)

(72) Inventors: Kondaveeti Lakshmi Ganesh, Bangalore (IN); Joseph Michael Clarke, Raleigh, NC (US); Carlos M. Pignataro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 735 days.

(21) Appl. No.: 15/152,024

(22) Filed: May 11, 2016

(65) Prior Publication Data

US 2017/0331669 A1 Nov. 16, 2017

(51) Int. Cl.
*G06F 15/16* (2006.01)
*H04L 12/24* (2006.01)

(52) U.S. Cl.
CPC ...... *H04L 41/0226* (2013.01); *H04L 41/0213* (2013.01)

(58) Field of Classification Search
CPC .................................................... H04L 43/04
USPC ....................................................... 709/223
See application file for complete search history.

(56) References Cited

U.S. PATENT DOCUMENTS

| 8,682,940 | B2 | 3/2014 | Van de Merwe et al. |
| 8,837,493 | B2 | 9/2014 | Casado et al. |
| 9,009,279 | B2 * | 4/2015 | Kuhles ............ H04L 29/12009 |
| | | | 709/223 |
| 9,094,299 | B1 | 7/2015 | Rao et al. |
| 10,129,125 | B2 * | 11/2018 | Agrawal ............ H04L 63/1441 |
| 2002/0165961 | A1 * | 11/2002 | Everdell ................ H04L 41/22 |
| | | | 709/225 |

(Continued)

OTHER PUBLICATIONS

Da Paz Ferraz Santos, P., et al., "Evaluating SNMP, NETCONF, and RESTful Web Services for Router Virtualization Management," 2015 IFIP/IEEE International Symposium on Integrated Network Management (IM), Federal University of Rio Grande do Sul, Porto Alegre, Brazil, May 11-15, 2015, 9 pages; http://www.cablelabs.com/wp-content/uploads/specdocs/VNE-TR-SDN-ARCH-V01-150625.pdf.

(Continued)

*Primary Examiner* — Hamza N Algibhah
(74) *Attorney, Agent, or Firm* — Polsinelli PC

(57) ABSTRACT

Approaches are disclosed for virtualizing a network management protocol (NMP). A network element offloads processes for communicating in the NMP to a virtualization engine (e.g., a backend virtualization proxy for the network element). The network element transmits a message containing a NMP request to the virtualization engine using service function chaining (SFC) by inserting service plane protocol data (e.g., a network service header (NSH)) into the message (e.g., an impregnated request). The virtualization engine expropriates, from the network element, processes for communicating in the NMP and can, thereby, reduce the computational resources used by the network element for communicating in the NMP. The virtualization engine generates a NMP response to the NMP request. The virtualization engine transmits a different message containing the NMP response to the network element using SFC by inserting service plane protocol data into the message (e.g., an impregnated response).

20 Claims, 10 Drawing Sheets

(56) References Cited

U.S. PATENT DOCUMENTS

| | | | |
|---|---|---|---|
| 2006/0095554 A1* | 5/2006 | Kuhles | H04L 29/12009 709/223 |
| 2009/0037713 A1* | 2/2009 | Khalid | H04L 12/4633 713/1 |
| 2013/0089089 A1* | 4/2013 | Kamath | H04L 12/413 370/358 |
| 2014/0101301 A1 | 4/2014 | Wanser et al. | |
| 2015/0019991 A1 | 1/2015 | Kristjánsson et al. | |
| 2015/0092564 A1 | 4/2015 | Aldrin | |
| 2015/0236936 A1* | 8/2015 | Waldbusser | H04L 43/0817 370/252 |
| 2015/0244780 A1* | 8/2015 | Parashar | H04L 67/10 709/201 |
| 2015/0281173 A1* | 10/2015 | Quinn | H04L 61/2507 709/245 |
| 2015/0295831 A1* | 10/2015 | Kumar | H04L 47/125 370/235 |
| 2015/0365322 A1* | 12/2015 | Shatzkamer | H04L 45/74 370/392 |
| 2017/0078176 A1* | 3/2017 | Lakshmikantha | H04L 43/0852 |
| 2017/0093658 A1* | 3/2017 | Ryan | H04L 43/067 |
| 2018/0375755 A1* | 12/2018 | Joshi | H04L 45/18 |
| 2019/0014454 A1* | 1/2019 | Garcia Martin | H04M 15/66 |

OTHER PUBLICATIONS

Quinn, P., et al., "Network Service Header," Network Working Group, Oct. 7, 2013, 21 pages; https://tools.ietf.org/pdf/draft-quinn-sfc-nsh-00.pdf.

Voit, E., et al., "Requirements for Subscription to YANG Datastores," Interface to the Routing System (i2rs), May 4, 2016, 16 pages; https://tools.ietf.org/pdf/draft-ietf-i2rs-pub-sub-requirements-07.pdf.

Case, J., et al., "A Simple Network Management Protocol (SNMP)," Network Working Group, RFC 1157, May 1990, 36 pages; https://tools.ietf.org/pdf/rfc1157.pdf.

Harrington, D., et al., "An Architecture for Describing Simple Network Management Protocol (SNMP) Management Frameworks," Network Working Group, RFC 3411, Dec. 2002, 64 pages; https://tools.ietf.org/pdf/rfc3411.pdf.

Case, J., et al., "Message Processing and Dispatching for the Simple Network Management Protocol (SNMP)," Network Working Group, RFC 3412, Dec. 2002, 43 pages; https://tools.ietf.org/pdf/rfc3412.pdf.

Levi, D., et al., "Simple Network Management Protocol (SNMP) Applications," Network Working Group, RFC 3413, Dec. 2002, 74 pages; https://tools.ietf.org/pdf/rfc3413.pdf.

Blumenthal, U., et al., "User-based Security Model (USM) for verstion 3 of the Simple Network Management Protocol (SNMPv3)," Network Working Group, RFC 3414, Dec. 2002, 88 pages; https://tools.ietf.org/pdf/rfc3414.pdf.

Wijnen, B., et al., "View-based Access Control Model (VACM) for the Simple Network Management Protocol (SNMP)," Network Working Group, RFC 3415, Dec. 2002, 39 pages; https://tools.ietf.org/pdf/rfc3415.pdf.

Presuhn, R., et al., "Version 2 of the Protocol Operations for the Simple Network Management Protocol (SNMP)," Network Working Group, RFC 3416, Dec. 2002, 31 pages; https://tools.ietf.org/pdf/rfc3416.pdf.

Presuhn, R., et al., "Transport Mappings for the Simple Network Management Protocol (SNMP)," Network Working Group, RFC 3417, Dec. 2002, 19 pages; https://tools.ietf.org/pdf/rfc3417.pdf.

Presuhn, R., et al., "Management Information Base (MIB) for the Simple Network Management Protocol (SNMP)," Network Working Group, RFC 3418, Dec. 2002, 26 pages; https://tools.ietf.org/pdf/rfc3418.pdf.

Enns, R., et al., "Network Configuration Protocol (NETCONF)," Internet Engineering Task Force (IETF), RFC 6241, Jun. 2011, 113 pages; https://tools.ietf.org/pdf/rfc6241.pdf.

Cotton, M., et al., "Internet Assigned Numbers Authority (IANA) Procedures for the Management of the Service Name and Transport Protocol Port Number Registry," Internet Engineering Task Force (IETF), RFC 6335, Aug. 2011, 33 pages; https://tools.ietf.org/pdf/rfc6335.pdf.

Leiba, B., et al., "Changing the Registration Policy for the NETCONF Capability URNs Registry," Internet Engineering Task Force (IETF), RFC 7803, Feb. 2016, 3 pages; https://tools.ietf.org/pdf/rfc7803.pdf.

* cited by examiner

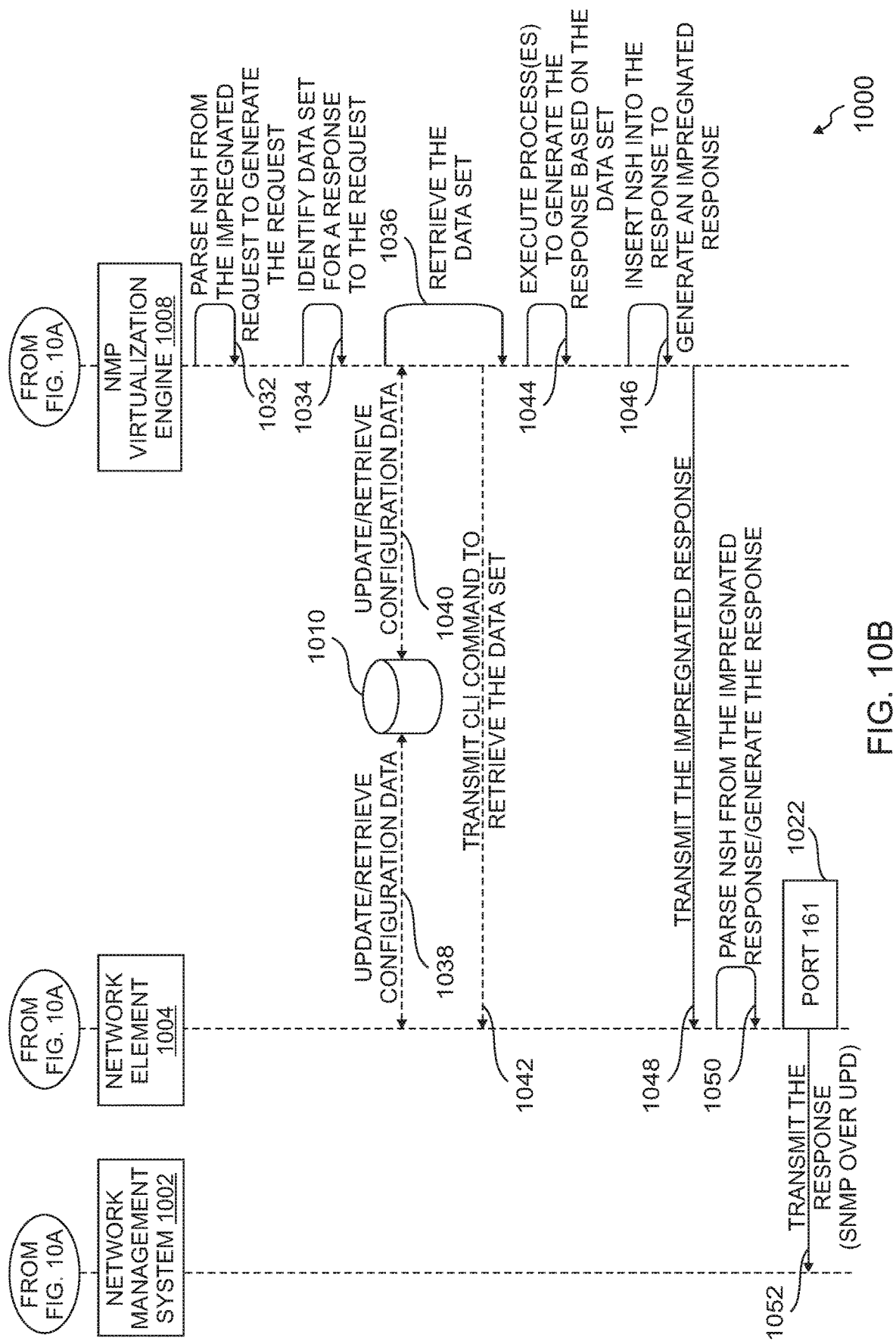

VIRTUALIZED NETWORK MANAGEMENT PROTOCOLS

TECHNICAL FIELD

This disclosure relates in general to the field of communications and, more particularly, to communicating in a network management protocol.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 10A and 10B are simplified diagrams of a system for communicating in a network management protocol, in accordance with some embodiments of the present disclosure.

DESCRIPTION OF EXAMPLE EMBODIMENTS

Overview

Figure 1:
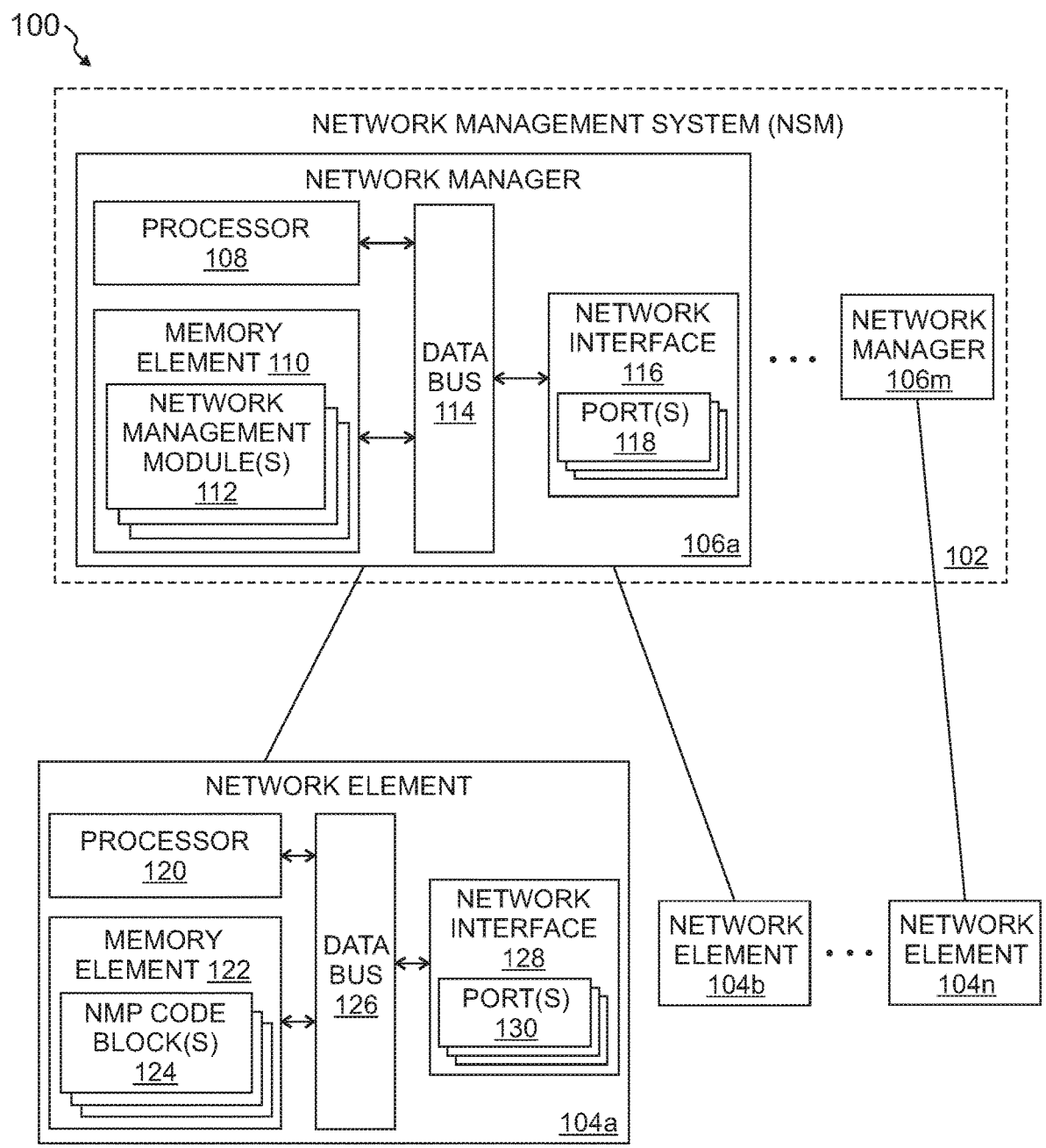
FIG. 1 is a simplified diagram of a network management system communicating with network elements in a network, in accordance with some embodiments of the present disclosure.

In some embodiments a method comprises receiving, by a network element, a request from a network management system (NMS), wherein the request identifies the network element as a final destination of the request and is encoded in a network management protocol (NMP); unloading, by the network element to a virtualization engine, processes associated with communicating in the NMP by: converting the request to an impregnated request by inserting into the request information identifying the network element and an interface of the network element on which the request was received, wherein the information is encoded in a service plane protocol, and transmitting the impregnated request to the virtualization engine.

In some embodiments a method comprises receiving, by a virtualization engine, a request encoded in a network management protocol (NMP), wherein the request identifies a network element as a final destination of the request; controlling, by the virtualization engine on behalf of the network element, processes associated with communicating in the NMP by: identifying a data set based on an identifier identifying the network element, the data set being associated with generating a response to the request, accessing the data set from a memory element coupled to the network element, and executing, on the data set, an instance of a code block to generate the response, the instance of the code block operating on the data set to output the response encoded in the NMP.

In further embodiments a method comprises detecting, by a virtualization engine, a change in an operational state associated with a network element, wherein a network management protocol (NMP) identifies that a remote device is to be notified of the change in the operational state; and controlling, by the virtualization engine on behalf of the network element, processes associated with communicating in the NMP by: identifying, based on the change in operational state and the NMP, a data set associated with generating a message to notify the remote device of the change in the operational state; accessing the data set from a memory element coupled to the network element, and executing, on the data set, an instance of a code block to generate the message, the instance of the code block operating on the data set to output the message encoded in the NMP.

Example Embodiments

A network management system (NMS) manages network elements. A NMS is inclusive of hardware and/or software operable to execute functions to manage network elements (both individually and collectively) within a network ('network management functions'). Such network management functions may be implemented in one or more network management protocols (NMPs). Examples of standardized NMPs include simple network management protocol (SNMP) and network configuration protocol (NETCONF). Standardized NMPs are NMPs that have been adopted by and/or published by a standards body or committee. The Internet Engineering Task Force (IETF) published, in 1990, Simple Network Management Protocol (SNMP) in Request for Comments (RFC) 1157. The IETF has adopted and updated various versions of SNMP. For example, the IETF published, in XXXX, Simple Network Management Protocol (SNMP) version 2 (referred to herein as 'SNMPv2') collectively in the following documents: RFC 1441, RFC 1442, RFC 1443, RFC 1444, RFC 1445, RFC 1446, RFC 1447, RFC 1448, RFC 1449, RFC 1450, RFC 1451, and RFC 1452. For example, the IETF published, in 2002, Simple Network Management Protocol (SNMP) version 3 (referred to herein as 'SNMPv3') collectively in the following documents: RFC 3411, RFC 3412, RFC 3413, RFC 3414, RFC 3415, RFC 3416, RFC 3417, and RFC 3418. NETCONF as referenced herein is inclusive of the protocol adopted by the IETF, in 2011, in RFC 6241, titled Network Configuration Protocol (NETCONF). NETCONF is also inclusive of derivatives or extensions (whether direct or indirect) of RFC 6241 such as RFC 6241, which was published in 2016 by IETF. A NMS may utilize a network management protocol (NMP) to gather configuration information regarding a network element (e.g., data describing a current configuration and/or operation of the network element) and/or modify the configuration information to modify a behavior of the network element. Network management functions implemented by a NMP (and utilized by an NMS) can include (but are not limited to) one or more of the following: notifications (e.g., detecting fault conditions, generating exceptions, generating customized user notifications), discovery (e.g., identifying network elements present in a network, detecting connection of a network element to the network, detecting connection of a network element from the network element), monitoring/accounting (e.g., pings, detecting an operational status of a network element, verifying compliance with SLAs), performance, security, and/or other metrics related to operation of the network element. The network management functions can include communications (e.g., reception and transmission of messages such as a request, a response, and/or a notification) with the network elements, where a content of the communication is encoded in the NMP. In SNMP, the network management functions are implemented as messages such as requests (e.g., GetRequest, SetRequest, GetNextRequest as defined in RFC 1157, SNMPv2, SNMPv3, or derivatives thereof; GetBulkRequest as defined in SNMPv2, SNMPv3, or derivatives thereof) and responses (e.g., Response and/or Trap as defined in either RFC 1157, SNMPv2, SNMPv3, or derivatives thereof; InformRequest as defined in SNMPv2, SNMPv3, or derivatives thereof), each of which is encoded in a protocol data unit (PDU) data structure. In NETCONF, the network management functions are implemented as operations (e.g., <get>, <get-config>, <edit-config>, <copy-config>, <delete-config>, <lock>, <unlock>, <close-session>, and/or <kill-session> as defined in RFC 6241), each of which is encoded in an Extensible Markup Language (XML) data structure.

A NMS includes one or more network manager devices that can execute code corresponding to a network management module. The code includes instructions for the network management protocol that implement the network management functions. Each network element that is managed by the network manager device implements the same NMP as the network manager device. The network manager device generates requests for the network element. The network element is responsible for generating a response the requests. Within the present disclosure, the terms 'NMP request' and 'request' are used interchangeably and the terms 'NMP response' and 'response' are used interchangeably. The requests can cause the network element to generate a response to the request (e.g., when the network element executes code corresponding to the NMP). Requests issued by the network manager device to the network element are encoded, at least in part, in the NMP. Responses issued by the network element to the network manager device are encoded, at least in part, in the NMP (i.e., the same NMP as the request generated by the network manager device). The network manager device may be an administrative computer (e.g., a network element with administrative rights to access and modify other network elements in the network and/or to access operational data describing the performance of one or more network elements). Each network element can execute a software agent (e.g., implemented as a code block) that enables the network element to communicate with a network manager device using the NMP. A code block is inclusive of group of instructions for execution by a processor. The code block may be encoded using any programming language (e.g., object-oriented, recursive, modular, and the like). The processor can execute one or more instances of the code block. When used by the processor, the code block may be a code library (DLL), compiled code, binary code, and the like derived from the programming language code. Each network manager device can execute a software agent (e.g., implemented as a code block) that enables the network manager device to communicate with a network element using the NMP. The agent software connects network elements and network manager devices within the network management system.

As used herein in this Specification, the term 'network element' is meant to encompass any servers (physical or virtual), end user devices, routers, switches, cable boxes, gateways, bridges, loadbalancers, firewalls, inline service nodes, proxies, processors, modules, or any other suitable device, component, element, proprietary appliance, or object operable to exchange, receive, and/or transmit data in a network environment. These network elements may include any suitable hardware, software, components, modules, interfaces, or objects that facilitate the network management operations disclosed herein. This may be inclusive of algorithms and communication protocols that allow for the effective exchange of data or information. Each of the network elements can also include suitable network interfaces for receiving, transmitting, and/or otherwise communicating data or information in a network environment.

Data, as used herein, refers to any type of source or object code, data structure, any type of numeric, voice, messages, video, media, or script data packet, or any other suitable information in any appropriate format that may be communicated from one point to another.

Turning to FIG. 1, FIG. 1 is a simplified diagram of a network management system for communicating with network elements in a network (i.e., network 100). Network 100 includes network management system (NMS) 102 and network elements 104a-n. The NMS 102 comprises network manager devices 106a-m, which can include any number of network manager devices. In this case, the NMS 102 includes m number of network manager devices (i.e., where m is an integer greater than zero). The network 100 can include any number of network elements. In this case, the network includes n number of network elements (i.e., where n is an integer greater than zero). Each network manager device manages one or more of the network elements 106a-n. Each network element is managed by one of the network manager devices 106a-m.

Within the context of the disclosure, a network represents a series of points, nodes, or network elements of interconnected communication paths for receiving and transmitting data that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of data in a network.

The network manager device 106a manages the network elements 104a and 104b. The network manager device 106a comprises a processor 108, a memory element 110, a data bus 114, and a network interface 116. The data bus 114 operably couples the components to one another. For example, the data bus 114 provides electrical connections by which the other components of the network manager device can electrically communicate. The memory element 110 stores network management modules 112. The network management modules 112 include code, that when executed by the processor, performs operations for managing the network elements. Each network management module is operable to, among other things, generate messages encoded in a network management protocol (NMP). It is noted that a 'message' and 'messages' is inclusive of any data used to control network elements in a network management system (e.g., the SNMP messages, NETCONF operations, and/or any other NMP messages). In operation, the network manager, uses a network management module (i.e., one or more of the modules 112) to generate messages encoded in the NMP and transmit the messages (over at least one of the ports 118) to the network elements. The network interface 116 includes a plurality of ports 118, each of which is configured to transmit and/or receive data over a network. The network manager device 106a uses the network management module, to receive responses in the NMP (over at least one of the ports 118) from network elements. Each of the other network elements comprises components similar to those as described with respect to network manager device 106a and the details are not repeated only for the purpose of brevity.

The network element 104a is managed by the network manager device 106a. The network element 104a comprises a processor 120, a memory element 122, a data bus 126, and a network interface 128. The data bus 126 operably couples the components to one another. For example, the data bus 126 provides electrical connections by which the other components of the network element can electrically communicate. The memory element 122 stores network management protocol (NMP) code blocks 124 (e.g., a software agent and the like). Each of the NMP code blocks 124 corresponds to one of the network management modules 112 (i.e., each pair of NMP code block and network management module utilizes the same NMP for communications with the other). The NMP code blocks 124 include code, that when executed by the processor 120, performs operations for communicating with the network manager device 106a to which the network element is coupled via the network management modules. Each of the NMP code blocks 124 is operable to, among other things, generate responses (encoded in the NMP) for responding to the messages of the network management modules 112. The network element must always execute code for communicating with the network manager device 106a. For example, the network element 104a keeps an at least one active thread (on the processor 120) executing the one of the NMP code blocks 124 (i.e., to be considered part of the NMS). The network interface 128 includes a plurality of ports 130, each of which is configured to transmit data to and/or receive data over a network. In operation, the network element uses a code block (i.e., one or more of the code blocks 124), to receive messages encoded in the NMP (over at least one of the ports 130) from the network manager device 106a. In addition, the network element uses the code block to encode responses in the NMP and transmit the responses (over at least one of the ports 130) to the network manager device 106a. While, in this example, the network element 104a is coupled to the network manager device 106a, in other examples, the network element 104a may be similarly coupled to (and communicate with) any of the network management devices 106a-m. Each of the other network elements (i.e., 104b-m) comprises components similar to those as described with respect to network element 104a and are not repeated only for the purpose of brevity.

In operation, each of the network elements 104a-n is operable to handle packets that have a final destination other than the network element. For example, the final destination of the packet is the network address identified in a destination field of the IP header. A network element, such as a router, often receives IP packets in which the IP header identifies an address of an endpoint (i.e., a device other than the network element). The router routes the packet toward the endpoint identified by the address (i.e., the final destination of the packet). The network management system 102 uses the networking manager devices 106a-m to manage and track the operational performance of the network elements, for example, using management plane messages (e.g., other IP packets) that identify the network element as the final destination. Thus, each network elements 104a-n handles packets of general network data traffic and packets of management plane data traffic associated with the network management system. A difference is that packets of the general network data traffic have a final destination that is an endpoint (and not the network element along the route/path) while packets of the management plane data traffic have a final destination that is the network element.

The network 100 may employ service function chaining (SFC) to alter a path of a packet (of general network data traffic) through the network and, thereby, force the packet through service functions before reaching its final destination. For example, some network elements may implement service function chaining (SFC) via a service function chaining protocol such as network service headers (NSH). The IETF's Network Working Group describes NSH in an Internet Draft document titled, Network Service Header (draft-ietf-sfc-nsh), which was first published in 2013. The 'NSH draft' as used herein refers to the Internet Draft document titled Network Service Header (draft-ietf-sfc-nsh) or any derivatives thereof (e.g., RFCs or standardized versions). Service function chaining enables the network elements to force a packet to follow a path through the network that is different from the path identified by routing tables in routers (or other network elements) in the network 100. For example, a network element such as a router often receives IP packets in which the IP header identifies an address of an endpoint (i.e., a device other than the network element). In such an example, the network element identifies (e.g., by performing a lookup in a routing table within a network element) the next network element (i.e., a next hop) to reach the endpoint (i.e., the final destination) from the current network element. Each network element performs a similar process to pass the packet to a next network element until the packet is transmitted to its final destination (i.e., the endpoint identified by the address). However, using service function chaining, a network controller (e.g., a SDN controller in a SDN network) and/or individual network elements can force the packet to pass through service functions before placing the packet back on a routed path to its final destination. The service functions may be service appliances (e.g., network elements) that are not on the routed path and that apply services to the packet. In this way, service function chaining enables packets to be passed through, e.g., security functions, firewalls, and/or other service functions before the packets are sent to its final destination. Thus SFC is often used by a network element to alter the route of packets while the packets are en route to their final destination (the final destination of the packet is a device that is different from the network element). In the example of network service headers (NSHs), the network service headers are added to (e.g., inserted into) the headers of data traffic (e.g., IP headers) that traverse network elements in the network. The NSHs are used to modify the path that the packet traverses to reach its final destination. Thus, the established function of a NSH is to force a packet to traverse a series of other nodes (i.e., a service chain) before reaching it final destination (e.g., used by deices along the path to the final destination). In particular, each NSH identifies a series of network elements that the packet must traverse and identifies a current point in the series at which the packet is located in the network.

Existing network management systems are challenging to upgrade and often consume large computational resources on a network element. As referenced above, each network element that is managed by a network management system (NMS) maintains an active thread (on a processor) executing a NMP code block that corresponds to the NMS. The NMP code block may be a software agent or other code for communicating with a network manager device in the NMS using messages encoded in a particular NMP. Consequently, changes to the NMP utilized by the network management system can require changes to (or complete replacement of) the NMP code block that runs on each network element. For example, if the network management system is to be updated to implement a new network management protocol, then the software agent on each network element must be updated to communicate using the new network management protocol. New management or control protocols are regularly created/released (and/or adopted by standards bodies). Additionally, some existing protocols (e.g., legacy protocols) lack functions needed to interoperate with modern network elements. For example, some features of SNMP have been deprecated in favor of other interfaces (e.g., XML interfaces, NETCONF, and the like). However, many existing systems utilize SNMP to manage network elements. Maintaining the operation of these existing protocols requires addressing technical problems created, for example, by the deprecated features or other interoperability issues related to a network that includes old and new system components that must cooperate. In addition, continuously executing a NMP code block is computationally expensive and produces computational overhead, which reduces the availability of processing for other system components. For example, SNMP code blocks (SNMP agents) produce computational overhead due to, for example, data structures and complex sort orders required for many network management functions. It is challenging to reduce computational overhead while maintaining compatibility with such legacy protocols.

A potential solution to the above problems is to build ad-hoc NMP engines (i.e., middleware) to bridge the gap between deprecated features of legacy protocols and new network elements. However, in many cases, the engines themselves cause bugs and data interoperability issues.

A potential solution to the problem of upgrade or changing network management protocols (e.g., NMP code blocks) is to use a translator proxy. A translator proxy is a proxy device (located on a frontend, between a network manager device and a network element) that replaces the network element in communicating with the network manager device. The network manager device no longer communicates directly with the network element. Prior to using the translator proxy for network management, the NMS must identify the translator proxy for the network element (e.g., by updating tables that identify where to send messages for the network element). In some examples, each network manager device in the NMS may implement a discovery protocol for discovering (and identifying such proxies), which introduces additional code blocks and computational overhead on each network management device. Once the translator proxy is identified, the network manager device only directly communicates with the translator proxy for managing the network element. In other words, the network manager device transmits requests to the translator proxy though such requests are associated with managing the network element. The requests are transmitted (e.g., from network manager devices) directly to the translator proxy and do not pass through the network element with which the requests are associated. The translator proxy translates the requests from a NMP (such as SNMP or NETCONF) to another language or protocol that can be directly understood by the network element. The translator proxy can transmit the translated requests to the network element for generating a response. A challenge with using a translator proxy is that, prior to using the translator proxy for network management, the NMS must identify the translator proxy for the network element. However, the NMS identifying the translator proxy and forwarding messages to the translator proxy introduces computational overhead into the network manager device (e.g., to implement discovery protocols, track and maintain state information for each proxy and corresponding network elements that it supports). Moreover, the problem of computational overhead is exacerbated in cases where each network manager device transmits mappings (between translator proxies and network elements) to each of the other network management devices in the NMS. Thus, although a translator proxy can reduce a computational load on the network element it may introduce overhead or complicate configuration/maintenance of the NMS. In addition, introducing a new NMP requires the NMS to be updated with new translator proxies and/or new operating systems to be loaded onto the translator proxies.

To address the above issues (and others), a new approach disclosed in the present disclosure, offloads (e.g., unloads, transfers, and the like), from a network element to a virtualization engine using in-band data, processes associated with communicating in a network management protocol (NMP) of a network management system (NMS). A NMP code block (and/or other executable code associated with the NMP) is not located on the network element. Instead, the NMP code block is virtualized in the sense that it resides on a device (i.e., the virtualization engine) that is remote from the network element. The NMP code block is removed from the network element and is replaced by instructions for Service Function Chaining (SFC) using Network Service Headers (SFC via NSH). The NMP code block is added to the virtualization engine. In addition, the virtualization engine implements the NSH protocol for communicating with the network element. This new approach enables existing network elements to implement new management protocols and only requires the network elements to implement the SFC via NSH mechanism to forward management plane traffic to the specific virtualization engine. In addition, present disclosure discloses using the SFC via NSH mechanism to share NMPs across disparate platforms. Advantageously, this mechanism can accelerate product development lifecycles due, at least in part, to less testing and integration being required to deploy new products and/or NMPs. Because the virtualization engine provides network management services to the network element using SFC via NSH, scaling the network management system by, e.g., changing the number of or configuration of the virtualization engines only requires changes to the virtualization engines (on the backend of the NMS). For example, using Grapevine technology, new virtual instances of NMP virtualization engines can be added or removed, as needed (e.g., even while the system continues to operate during the addition or removal), to support additional data traffic and/or network elements. In addition, one NMP virtualization engine can handle multiple network elements and, thereby, can reduce complexity of the NMS by reducing the number of NMP virtualization engines in the network. In addition, legacy protocols (e.g., SNMP) can be supported without the need to develop middleware or adapt existing SNMP agents for new network elements.

Using the new approach disclosed herein, the network element and the virtualization engine communicate using, at least in part, Network Service Headers (NSH) (e.g., as defined in the NSH draft) to disconnect the network element from the particular network management protocol (NMP) used by the network management system (NMS). Consequently, the network element becomes agnostic with respect to the underlying NMP used by the NMS. For example, the network element can use SFC via NSH to relay NMP requests, received from a network manager device, to the virtualization engine. Within the present disclosure, the terms 'NMP request' and 'request' are used interchangeably; each is inclusive of data encoded in a NMP. The network element uses NSH to unload, to the virtualization engine, processes associated with communicating in the NMP (e.g., generating responses to the requests). The virtualization engine uses NSH protocol to control (take over, expropriate), on behalf of the network element, the processes associated with communicating in the NMP. For example, the virtualization engine uses the NMP code block to generate responses to the requests and uses SFC via NSH to relay the responses back to the network element. The network element then strips away the NSH from the response and transmits the response to the network manager device. Although the virtualization engine handles processes for generating the response, ultimately the network element transmits the response back to the network manager device. Because the processes for generating the response is offloaded on the backed of the NMS, the network manager device is unaware that the network element offloaded the generation of the response to the virtualization engine.

As described above, traditional systems utilize NSH to re-route data traffic that flows through the network element (and not data traffic that terminates in the network element, such as management plane traffic). The present disclosure utilizes uses the NSH protocol for management plane data traffic that terminates in the network element (e.g., IP packets of management plane data traffic that identify the network element as the final destination of the packet). In other words, the present disclosure discloses using SFC via the NSH protocol as a management plane protocol that abstracts the underlying NMP. As discussed above, an established function of NSH protocol is to force a packet to traverse a series of other nodes (i.e., a service chain) before reaching it final destination. However, in the present disclosure, the NSH protocol is not used to modify the path that the packet traverses to reach its final destination. Indeed, in the present disclosure, the NSH protocol is used after the packet has reached its final destination and is used to encapsulate metadata about the network element on which the packet was received and to communicate with the virtualization engine. In addition, the present disclosure offloads processes to the virtualization engine utilizing in-band data (i.e., NSH protocol headers inserted into the requests and/or the responses) in contrast to other systems that use out-of-band data (e.g., where requests are transmitted to a translator proxy and do not pass through the network element). The network element relays the requests (impregnated with NSHs) to a back-end virtualization engine. The NMS (e.g., the network manager device) is unaware that the network element is using the virtualization engine to, at least in part, generate responses to requests. From the prospective of the NMS, the network element handles its own NMP requests. However, the network element relies on the processing capabilities of the virtualization engine to handle most processing related to the NMP requests and to generate responses. The computational resources required for executing NSH code blocks is significantly less than that for continually executing NMP code blocks. Advantageously, because each network element transmits data in-band using the NSH protocol (within the requests), the amount of computational resources consumed by the network element is reduced relative to implementing the NMP code block. Moreover, the network manager devices in the NMS do not need to discover the virtualization engine (i.e., as is the case for translator proxies) since they are located on the backed ("behind") the network elements. In effect, the NMS is unaware of the virtualization engine. The network manager devices only communicate with the network element. In turn, the network element communicates, on the backend, with a virtualization engine. The new approach disclosed herein enables dynamically scaling (e.g., up or down) the virtualization engines in the NMS (e.g., by creating new instances of virtualization engines and/or executing new instances of the NMP code blocks on existing virtualization engines). Each virtualization engine, as disclosed herein, can take on NMP processes for multiple network elements or can be dedicated to a single network element. Advantageously, because the virtualization engines implement the NMP code blocks (and not the network elements), existing network management protocols can be swapped out for new network management protocols without changing code blocks on the network element. In addition, such swapping of network protocols requires no changes to the network manager devices.

The present disclosure goes beyond mere data translation (e.g., as is performed by some translator proxies) and discloses a network element that encapsulates metadata in an NSH protocol header, inserts the NSH protocol header into an IP header of a request (i.e., an impregnated request), and transmits the impregnated request to a virtualization engine. The virtualization engine determines what data set is needed to generate a response and retrieves the data set (e.g., by directly querying the device (pull), checking a state machine corresponding to the device (push), or access a shared data base (hybrid)). The virtualization engine formulates a response to the request on behalf of the network element (i.e., acting as a specialized backend proxy of the network element). This goes beyond mere translation and data gathering and performs substantive data processing, conversion and code execution, which reduces computational resources consumed by the network element. No changes are needed to the NMS (e.g., network manager devices in the NMS does not need to discover the virtualization engine and send messages thorough it) to implement the system disclosed herein.

It is noted that devices disclosed herein (e.g., network elements, NMP virtualization engines, registration handlers, and/or network manager devices, etc.) can include memory elements for storing information to be used in achieving the network management activities, as outlined herein. Additionally, each of these devices may include a processor that can execute software and/or an algorithm to perform the network management activities as discussed in this Specification. These devices may further store data in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the term 'memory element.' Similarly, any of the potential processing elements, modules, and machines described in this Specification should be construed as being encompassed within the broad term 'processor.' Each of the devices can also include suitable network interfaces for receiving, transmitting, and/or otherwise communicating data or information in a network environment.

Figure 2A:
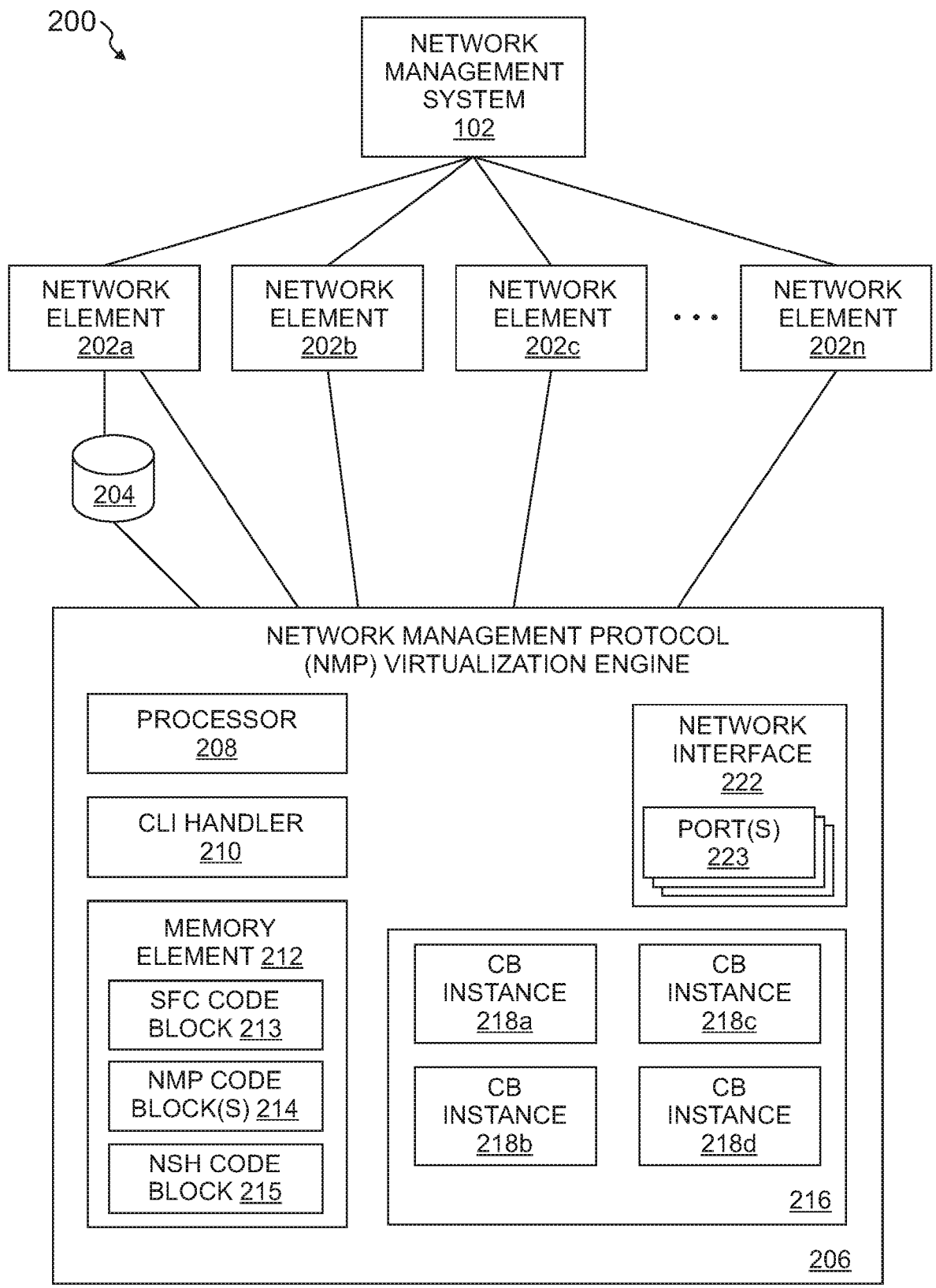
FIG. 2A is a simplified diagram of a network in which network elements unload processes associated with a network management protocol, in accordance with some embodiments of the present disclosure.

Turning to FIG. 2A, FIG. 2A is a simplified diagram of a network (i.e., network 200) in which network elements unload processes associated with a network management protocol to a virtualization engine. The network 200 comprises the network management system (NMS) 102, network elements 202a-n, a data store 204, and a network management protocol (NMP) virtualization engine 206. The NMS uses a NMP to manage the network elements 202a-n. The network management system 102 is described with respect to FIG. 1 is not repeated here only for brevity.

The NMP virtualization engine 206 controls, on behalf of the network elements 202a-n, processes associated with communicating in the NMP. The NMP virtualization engine 206 comprises a processor 208, a command-line interface (CLI) handler 210, a memory element 212, static random-access memory (SRAM) 216, and a network interface 222. The network interface 222 includes a plurality of ports 223, each of which is configured to transmit data to and/or receive data over a network. The processor 208 operates the components within the network management protocol virtualization engine 206. The NMP virtualization engine 206 uses the CLI handler 210 to gather data from the network elements 202a-n using low-level instructions (e.g., commands or other instructions at a lower layer of abstraction than the NMP code block, which resides at the application layer). For example, the low-level instructions may be hardware, firmware, assembler, kernel, and/or operating system instructions. The low-level instructions can include instructions directly executable by an operating system of the network element, a machine code directly executable by hardware of the network element, and/or CLI commands.

The low-level instructions are less resource intensive than the NMP code block. For example, the NMP virtualization engine 206 is able to use low-level instructions to gather, from the network element, a data set needed to respond to a NMP request. The low-level instructions are formatted in a protocol that is less computationally expensive for the network element than the NMP code block is to execute (e.g., command line interface (CLI)). NMP code blocks are located in the NMP virtualization engine 206. The memory element 212 stores NMP code blocks 214, a NSH code block 215, and an SFC code block 213. The NMP virtualization engine 206 uses the NMP code blocks to process NMP requests and generate NMP responses to the NMP requests. The NSH code block 215 implements the NSH protocol. The NMP virtualization engine 206 uses the NSH code block 215 to receive impregnated requests from the network elements 202a-n (e.g., on one of the ports 223). The SRAM 216 includes code block (CB) instances 218a-d. Each of the CB instances 218a-d corresponds to one of the NMP code blocks 214 for which an instance is executed by an active thread. In effect, each of the CB instances 218a-d is a software agent operating on behalf of one or more of the network elements 202a-n. In contrast to traditional systems, the software agent is not located in the network elements 202a and is located (virtualized) in the NMP virtualization engine 206. Each of the CB instances 218a-d is configured to implement network management functions for a network element as if the CB instances 218a-d were located on the network element itself. To do this, the NMP virtualization engine 206 uses the CLI handler 210 to retrieve data needed to construct a NMP response (in response to a NMP request) and passes the data back to the CB instance 218a-d to construct the NMP response. Each CB instance may implement network management functions for one or more network elements. In addition, each CB instance is operable to, when executed on a data set, output a message (e.g., request, response, notification, and others) encoded in the NMP. In the example of FIG. 2A, the network element 202a is managed by the CB instance 218a; each of the network elements 202b and 202c is managed by the CB instance 218b; each of the remaining network elements (up to and including network element 202n) is managed by the CB instance 218c.

Each of the network elements 202a-n of FIG. 2A include components as described with respect to the network elements 104a-n of FIG. 1 with at least one exception: the NMP code blocks 124 in the network elements 104a-n are replaced by a NSH code block and/or an SFC code block in the network elements 202a-n. In particular, a difference between the network elements 202a-n of FIG. 2A and the network elements 104a-n FIG. 1 is that the network elements 202a-n lack the NMP code blocks 124. In the network elements 202a-n, SFC and/or NSH protocol code blocks replace the NMP code blocks 124. Advantageously, each of the network elements 202a-n of FIG. 2A consumes fewer computational resources than each of the network elements 104a-n due, at least in part, to the SFC and/or NSH protocol code blocks replacing the NMP code blocks 124. Thus, the addition of the SFC and/or NSH protocol code blocks (and/or removal of the NMP code blocks) improves the functioning of the network element itself, at least in part, by reducing its computational overhead (e.g., CPU clock cycles) used in generating responses to NMP requests. In some implementations, the data store 204 is a database that is accessible by the network element 202a and the NMP virtualization engine 206. The data store 204 stores information identifying states and/or operational statuses of the network element 202a. In some examples, the network element 202a periodically updates the information in the data store 204 to reflect current states and/or operational statuses of the network element 202a. In other examples, the data store 204 is a mirror of the states and/or operational status information stored locally on the network element 202a (e.g., the data store 204 is immediately updated whenever a change occurs in the network element 202a). Each of the other the network elements 202b-n includes components as described with respect to the network element 202a. Example implementations of the network elements 202a-n are described with respect to FIGS. 3 and 4 below.

Figure 3:
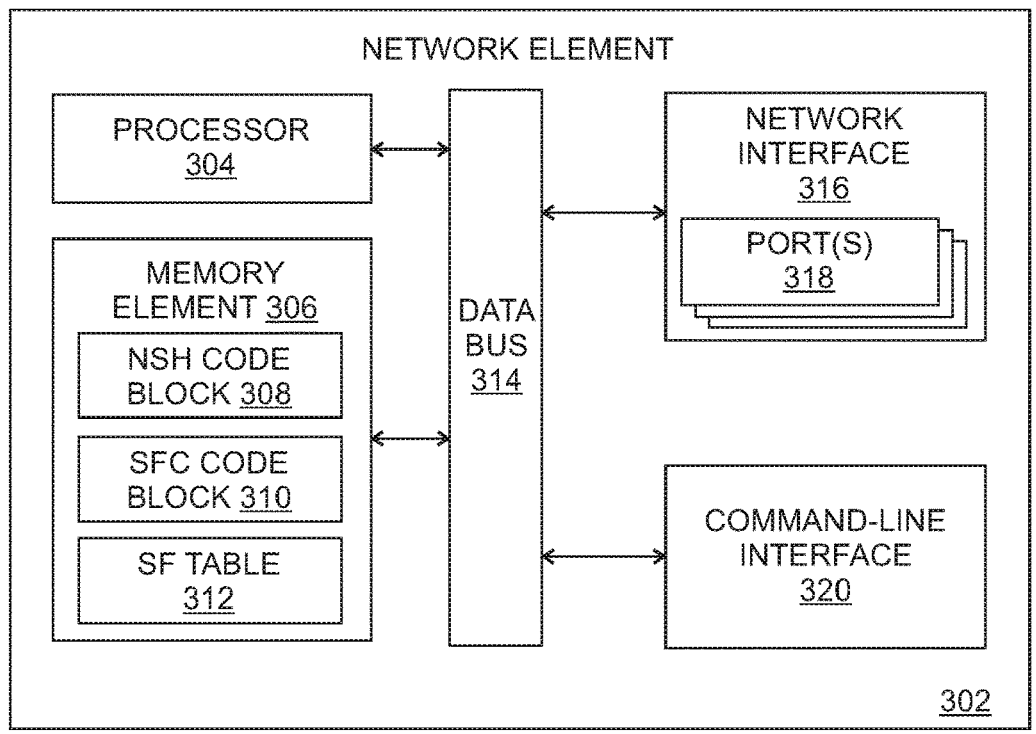
FIG. 3 is a simplified diagram of a network element configured to unload processes associated with a network management protocol, in accordance with some embodiments of the present disclosure.

Turning briefly to FIG. 3, FIG. 3 is a simplified diagram of a network element (i.e., network element 302) configured to unload processes associated with a network management protocol. The network element 302 is an example of any one or more of the network elements 202a-n of FIG. 2A. The network element 302 comprises a processor 304, a memory 306, a data bus 314, a network interface 316, and a command line interface 320. The memory 306 lacks a NMP code block and includes a NSH code block 308, a SFC code block 310, and a service function (SF) lookup table 312. Executing (by the processor 304) the NSH code block 308, the SFC code block 310, and the SF lookup table 312 is less computationally expensive than executing the NMP code blocks. The processor 304, among other things, executes the NSH code block 308 and/or the SFC code block 310 to forward NMP requests to a NMP virtualization engine (e.g., the NMP virtualization engine 206 FIG. 2A) using SFC via NSH. The network interface 316 includes a plurality of ports 318, each of which is configured to transmit and/or receive data over a network. The command line interface 320 is operable to execute CLI commands (e.g., generated by a CLI handler in the NMP virtualization engine). The network element 302 uses the SF lookup table 312 to lookup an address of the NMP virtualization engine based, at least in part, on the particular NMP in which the NMP request is encoded. For example, the network element 302 may receive (from a registration handler device) the SF lookup table 312 and a unique identifier (UID) of the network element 302 during a process of registering with the registration handler device. The SF table 312 associates each of one or more network management protocols (NMPs) (such a SNMP, NETCONF and the like) with a corresponding NMP virtualization engine. The SF table 312 may include one or more tables (e.g., more than one data structure portion). In particular, the SF lookup table 312 may include a first table storing a correspondence between a combination of an identifier of a port on the network interface 316 and a transport protocol, and the NMPs. For example, the network element can identify a network management protocol based on a combination of the Internet socket port number and the transport protocol in which the packet is encoded. The Internet Assigned Numbers Authority (IANA) assigns uses of port numbers for protocols. In the case of transport protocols, IANA publishes and manages a Service Name and Transport Protocol Port Number registry (the 'IANA registry') as defined in Internet Engineering Task Force (IETF) publication RFC 6335. Each of a plurality of transport protocols (i.e., protocols that define communication standards at the Transport Layer of the Internet Protocol Suite) has an official and/or unofficial use for each of a plurality of Internet socket ports. Official uses are assigned by the IANA and the assignment is indicated in the registry. Unofficial uses are not assigned by the IANA. In some cases, the unofficial uses are de facto or commonly used functions. For official uses, IANA assigns a service such as a network management protocol (and service names identifying the service) to a combination of a port number and a transport protocol. For example, the IANA registry contains services (if any) assigned to port numbers ranging from 0-49151 for each of TCP, UDP, UDP-Lite, SCTP, and DCCP. Not every combination of port number and transport protocol are assigned. IANA distinguishes those that are assigned from those that are not using states including "Assigned" (assigned to a service and not available for assignment), "Unassigned" (not assigned to a service and available for assignment), and "Reserved" (e.g., reserved for future use and not available for assignment). Thus, the first table may include, at least in part, the IANA registry or a portion thereof. For example, Table 1 below illustrates an exemplary first table of the SF lookup table 312.

TABLE 1

An exemplary first table of the SF lookup table 312

| Port Number | Transport Protocol | Service |
|---|---|---|
| 161 | UDP | Simple Network Management Protocol (SNMP) |
| 162 | TCP | Simple Network Management Protocol Trap (SNMPTRAP) |
| 162 | UDP | Simple Network Management Protocol Trap (SNMPTRAP) |
| 830 | TCP | NETCONF over SSH |
| 830 | UDP | NETCONF over SSH |
| 831 | TCP | NETCONF over BEEP |
| 831 | UDP | NETCONF over BEEP |
| 832 | TCP | NETCONF for SOAP over HTTPS |
| 832 | UDP | NETCONF for SOAP over HTTPS |
| 833 | TCP | NETCONF for SOAP over BEEP |
| 833 | UDP | NETCONF for SOAP over BEEP |
| 6513 | TCP | NETCONF over TLS |

The network element can use the first table to determine network management protocols (NMPs) based on the transport protocol and the port on which a request packet is received. The SF lookup table 312 may include a second table storing the one or more NMPs and a correspondence with one or more service functions types (e.g., NMP code block (CB) instances). After a network management protocol (NMP) is known, the network element 302 uses the second table to identify which type of NMP CB instance of the plurality of types of NMP CB instances should be used to handle the NMP. For example, the second table may store a correspondence between the SNMP protocol (i.e., the NMP) and a SNMP agent (i.e., where SNMP is the 'type' of the CB instance). The SF lookup table 312 may include a third table storing one or more service functions (type of CB instance) and correspondence with addresses of one or more virtualization engines that executes an instance of a corresponding service function. After the type of CB instance (e.g., the service function) is known, the network element 302 uses the third table to lookup the address of a NMP virtualization engine that includes the CB instance. For example, if the service function is a NETCONF CB instance, the third table may include a correspondence between addresses of NMP virtualization engines and the identifiers of NETCONF CB instances operating on the virtualization engines. Thus, a network element can use the third table to identify a specific instance of a software agent to which it can offload the process of generating a response to NMP requests in a particular NMP. The SF lookup table 312 enables the network element to identify a virtualization engine to which it is to offload NMP requests for a particular NMP. Turning back to the example of FIG. 2A, the network element 202a determines (based on the SF lookup tables or a portion thereof) to offload SNMP requests to a particular CB instance 218a in the virtualization engine 206.

Figure 4:
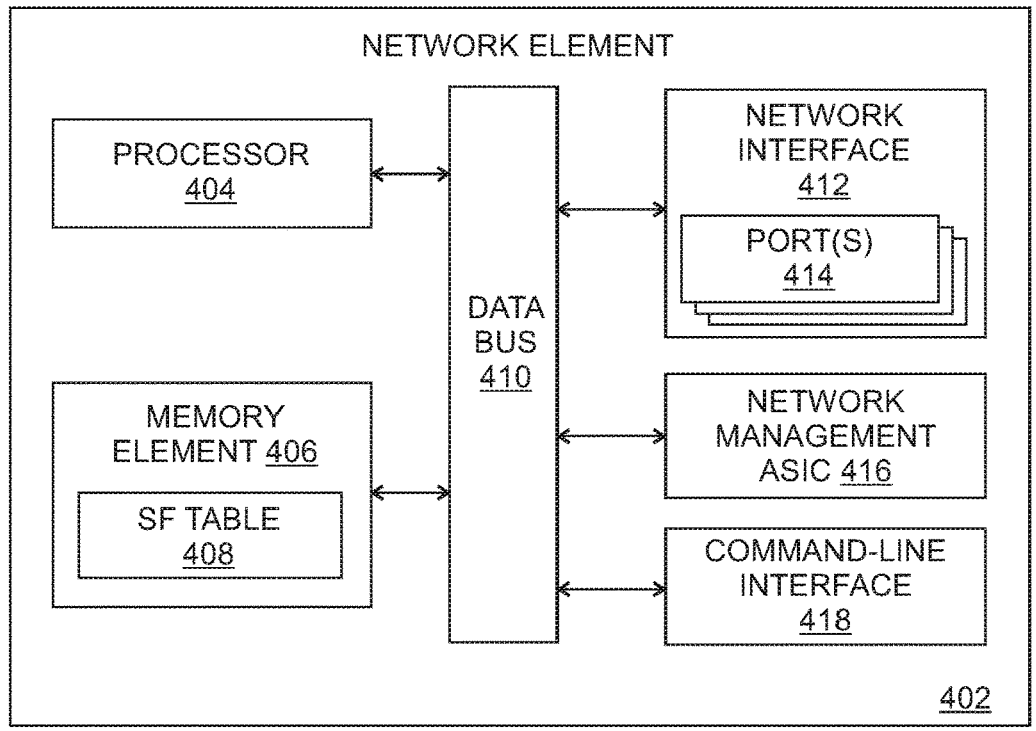
FIG. 4 is a simplified diagram of another network element configured to unload processes associated with a network management protocol, in accordance with some embodiments of the present disclosure.

Turning briefly to FIG. 4, FIG. 4 is a simplified diagram of another network element 402 configured to unload processes associated with a network management protocol. The network element 402 is an example of any one or more of the network elements 202a-n of FIG. 2A. The network element 402 comprises a processor 404, a memory 406, a data bus 410, a network interface 412 (which comprises ports 414), a network management application specific integrated circuit (ASIC) 416, and a command-line interface 418. The network element 402 of FIG. 4 is similar to network element 302 of FIG. 3. In particular, the processor 404, the memory 406 (and the SF lookup table 408), the data bus 410, the network interface 412 (including the ports 414), and the command-line interface 418 in the network element 402 of FIG. 4 are similar to the processor 304, the memory 306 (and the SF lookup table 312), the data bus 314, the network interface 316 (including the ports 318), and the command-line interface 320 (respectively) in the network element 302 of FIG. 3; the details of these components are not repeated here for brevity. A difference between the network element 402 of FIG. 4 and the network element 302 of FIG. 3 is that the network element 402 of FIG. 4 lacks SFC and NSH code blocks. Instead, the network element 402 of FIG. 4 includes the network management ASIC hardware 416, which is programmed with specific instructions corresponding to the NSH code block 308 and the SFC code block 310. In particular, the network management ASIC hardware 416 is capable of executing the instructions that offload processes associated with communicating in the NMP (e.g., and thereby, reduces power use, frees up processor for other computations, and/or makes NMP transactions faster). This further improves performance of the network element 402 of FIG. 4 (i.e., relative to the network element 302 of FIG. 3) by further offloading the processes from the processor 404 to a specific hardware layout (i.e., the network management ASIC 416).

In summary, each of the network elements 302 and 402 is an apparatus comprising a network interface (including a plurality of ports), a memory element to store code, and at least one processor coupled to the memory element and network interface. The network interface can receive, on a port of the plurality of ports, a request from a NMS. Such requests identify the receiving network element as a final destination of the requests and the requests are encoded in a NMP. The network interface is used to transmit an impregnated request to a virtualization engine. The at least one processor is configured to execute the code to perform operations. For example, the operation can comprise (among other things) unloading, to the virtualization engine, processes associated with communicating in the NMP by converting the request to the impregnated request by inserting into the request information (e.g., encoded in a service plane protocol) identifying the network element and the port on the network interface on which the request was received.

Turning back to FIG. 2A, in operation, the network management system 102 transmits NMP requests (e.g., a request packet encoded, at least in part, in the network management protocol) to a network element (e.g., one of the network elements 202a-n). The NMP request identifies the network element as a final destination (e.g., a destination field of the packet identifies a network address of the network element) and is encoded in the NMP (e.g., such as SNMP, NETCONF, and the like). As an example, the NMS 102 may transmit the NMP request to the network element 202a (e.g., where the network element 202a is implemented as the network element 302 of FIG. 3). The network element 202a receives the NMP request on a port of a network interface of within the network element 202a (e.g., one of the ports 318) from the NMS 102. The network element 202a offloads, to the NMP virtualization engine 206, processes for generated a NMP response to the NMP request. For example, the network element 202a offloads such processes by converting the NMP request to an impregnated request. The network element 202a encodes, in a network service header using the NSH code blocks (e.g., NSH code block 308 or network management ASIC 416), information identifying the network element (e.g., a unique identifier (UID) of the network element) and the interface of the network element on which the request was received (e.g., an identifier of the port in the network interface of the network element 202a). The network element 202a generates the impregnated request by inserting the NSH protocol header into a header of the NMP request (e.g., into an IP header corresponding to the NMP request). The FIGS. 2B-2D illustrate examples of messages (e.g., requests and/or responses) and impregnated messages.

Figure 2B:
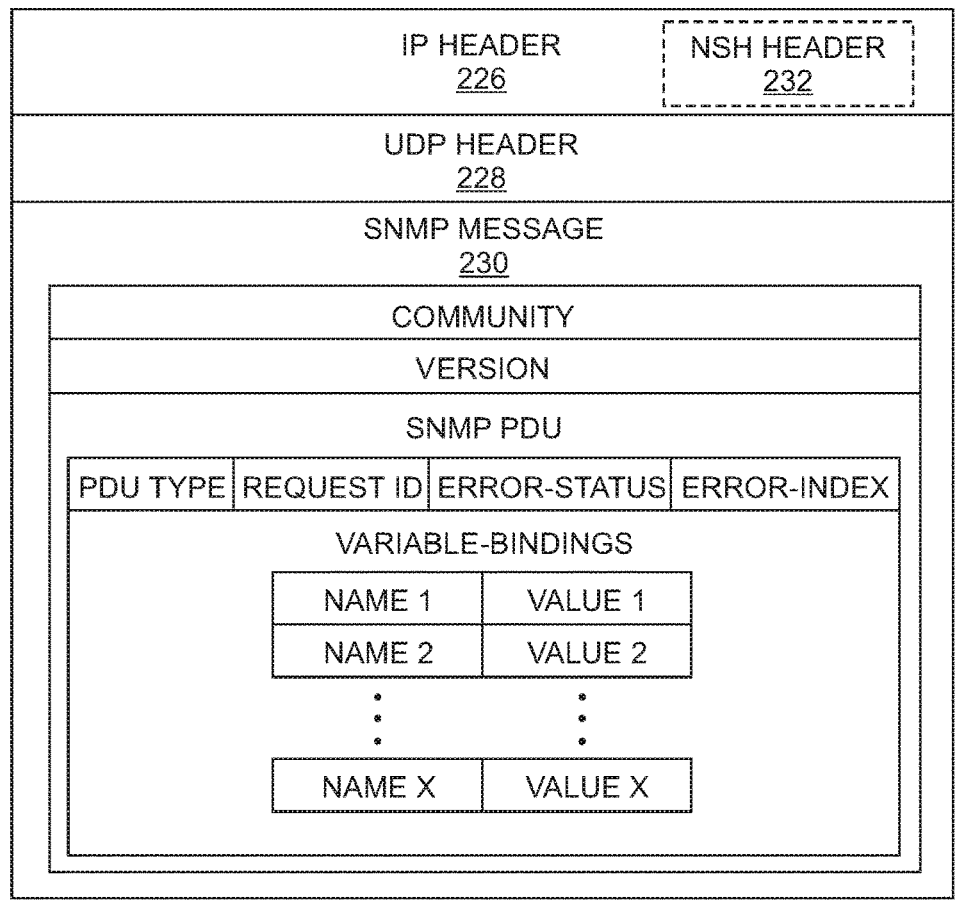
FIG. 2B is a simplified diagram a network management protocol message impregnated with information encoded in a service plane protocol.
Figure 2C:
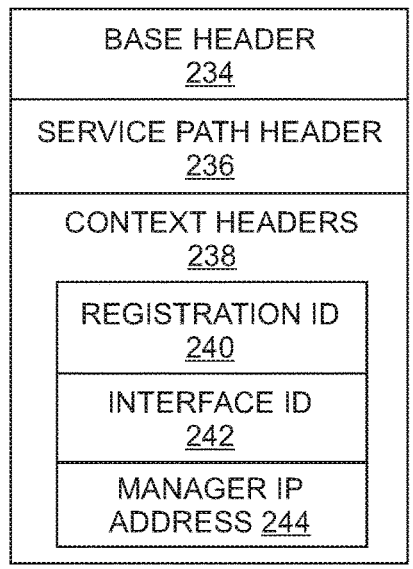
FIG. 2C is a simplified diagram of information encoded in a service plane protocol for impregnation in a request.
Figure 2D:
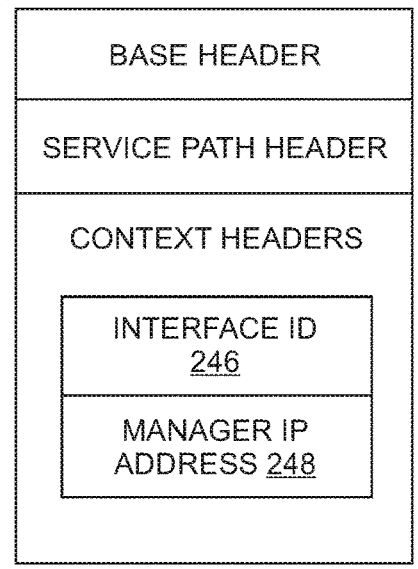
FIG. 2D is a simplified diagram of information encoded in a service plane protocol for impregnation in a response.

FIG. 2B is a simplified diagram of a network management protocol message impregnated with information encoded in a service plane protocol (i.e., an impregnated message 224). The message 224 is a message that is encoded, at least in part, in a network management protocol (NMP). The impregnated message 224 comprises an Internet protocol (IP) header 226, a user data protocol header (UDP) header 228, and a simple network management protocol (SNMP) message 230. The SNMP message 230 comprises a community field, a version field, and a SNMP protocol data unit (PDU). The IP header includes an IP address of a device, which is the final destination of the message 224. The SNMP PDU comprises a PDU type (e.g., GetRequest, SetRequest, GetNextRequest, GetBulkRequest, Trap, InformRequest, and/or Response as defined in RFC 1157, SNMPv2, SNMPv3, or derivatives thereof), a request ID, an error status, an error index, and variable bindings. The variable bindings include name/value pairs that identify a variable by name and identify a value of the variable. These pairs can be used to retrieve (i.e., 'Get') and/or to modify (i.e., 'Set') a value of a variable.

The SNMP message 230 is encoded in SNMP (i.e., the network management protocol). Thus, the impregnated message 224 is encoded, in part, in the service plane protocol. Other portions of the message are encoded in a transport layer protocol (e.g., the UDP header 228 is encoded in UDP, which is a transport layer protocol) or in an Internet layer protocol (e.g., the IP header 226 is encoded in IP, which is a Internet layer protocol). It is noted that the present disclosure is not limited to SNMP messages. Indeed, the SNMP message 230 may be replaced by a NETCONF (or other network management protocol) message and/or operation in other embodiments of the present disclosure.

A network service header 232 is inserted into the IP header 226. The network service header 232 is encoded NSH (e.g., according to the NSH draft), which is a service plane protocol and, in particular, is a service function chaining protocol. Thus, a service plane protocol header (i.e., NSH) is encapsulated in an Internet layer protocol header (i.e., IP) for a message encoded in a network management protocol (i.e., SNMP).

The impregnated message 224 may be utilized with or without the NSH header 232. When the NSH header 232 is excluded (or stripped away, parsed from impregnated message 224, the message 224 may be a request or a response based on, e.g., content within the message 230 and whether a network element or a virtualization engine generates the impregnated message). When the NSH header 232 is included, the impregnated message 224 may be an impregnated request or an impregnated response based on, e.g., content within the message 230, whether a network element or a virtualization engine generates the impregnated message, and the content within the NSH header 232 (which is discussed with respect to FIGS. 2C and 2D). FIG. 2C is a simplified diagram of information encoded in a service plane protocol for impregnation in a request. FIG. 2D is a simplified diagram of information encoded in a service plane protocol for impregnation in a response.

Turning to FIG. 2C, FIG. 2C is a simplified diagram of a network service header (NSH) 232 for impregnation in a request. In FIG. 2C, the network service header 232 comprises a base header 234, a service path header 236, and context headers 238. The base header 234 provides information about the service header and the payload protocol. The service path header 236 identifies a path for the packet and identifies the location at which the packet is currently located within the path. The context headers 238 can carry metadata and variable length encoded data. Because the NSH 232 of FIG. 2C is to be inserted into a request, the information in the context headers is that which a network element would encode in the NSH 232. The context headers 238 include a registration ID, an Interface ID 242, and a Manager IP address 244. The registration ID 240 identifies the network element. For example, the registration ID may be a unique identifier of the network element (e.g., UID) assigned by a registration handler to the network element during a registration process. The Interface ID 242 identifies an interface of the network element on which the request was received (e.g., a port on a network interface on which the request was received). The manager IP address 244 identifies a network manager device from which the request was received. The manager IP address may further include a port on which the network manager device transmitted the request to the network element.

Turning to FIG. 2D, FIG. 2D is a simplified diagram of another version of a network service header 232 for impregnation in a response. The NSH 232 includes the base header, the service path header, and context headers as described with respect to FIG. 2C. Because the NSH 232 of FIG. 2D is to be inserted into a response, the information in the context headers is that which a virtualization engine would encode in the NSH 232 (before transmitting the impregnated response to a network element). The context headers include an interface identifier (ID) 246, and a manager IP address 248. The interface ID 246 identifies an interface of the network element on which to transmit the response (e.g., a port on a network interface on which to transmit the response). The manager IP address 244 identifies a network manager device to which to transmit the response. The manager IP address may further identify a port on the network manager device to which to transmit the response.

Turning back to the example of FIG. 2A, the message 224 of FIG. 2B (without the NSH 232) is an example of the request received by the network element 202a from the NMP virtualization engine 206. The network element 202a generates the NSH 232 of FIG. 2C and inserts the header into the request to generate the impregnated request (including the NSH header). The network element 202a transmits the impregnated request to the NMP virtualization engine 206. The NMP virtualization engine 206 receives the impregnated request from the network element 202a and takes over the process of generating a response for the network element 202a. The impregnated request is encoded, at least in part, in a NMP (e.g., the request packet is formatted in the NMP and includes a NSH protocol header) and identifies the network element 202a as a final destination of the request (e.g., an IP address in an IP header of the request identifies the network element 202a). Although the impregnated request identifies the network element 202a is the final destination, the network element uses service function chaining logic (i.e., implemented by the SFC code block 213 and NSH code block 215) to relay the impregnated request to the NMP virtualization engine 206 (i.e., by forcing the impregnated request to pass through the NMP virtualization engine 206). The NMP virtualization engine 206 converts the impregnated request to the request (i.e., back to the original request) by parsing (from the impregnated request) the NSH, which includes information identifying the network element and the interface of the network element on which the request was received. The NMP virtualization engine 206 retains the information (i.e., information associated with the request) on behalf of the network element 202a. The network element does not retain the information associated with the request (and, therefore, is stateless with respect to offloading the processing of the NMP request to the NMP virtualization engine 206). In some examples, a processor in the network element 202a may delete all state information associated with the request. In addition, the virtualization engine 206 identifies the NMP in which to encode a response based on the information. Advantageously, the NMP virtualization engine 206 controls the processes associated with communicating in the NMP on behalf of the network element 202a. The NMP virtualization engine 206 can identify, based on the request, a data set needed to generate a response to the request. The NMP virtualization engine 206 retrieves the data set (e.g., using low-level instructions and/or the data store 204). The NMP virtualization engine 206 accesses the data set from a memory element coupled to the network element 202a. For example, the memory element may be a local memory element located within the network element itself. In such an example, the virtualization engine 206 may utilized the CLI handler 210 to issue low-level instructions to retrieve the data set from the local memory element within the network element 202a. The network element replies to the low-level instructions. In other cases, the memory element may be a data store located outside of the network element itself. In the example of FIG. 2A, the data store 204 is a memory element located outside of the network element 202a. In these cases, the NMP virtualization engine 206 can query the data store 204 for the data set. No computational resources are needed from the network element 202a when the virtualization engine 206 queries the data store 204. Each of these example data set retrievals represents a savings of computational resources (e.g., reduced CPU cycles by the network element 202a) relative to executing NMP code blocks. After accessing and/or retrieving the data set, the NMP virtualization engine 206 executes, on the data set, an instance of a NMP code block to generate the response. In this example, the NMP virtualization engine 206 executes (using the processor 208) CB instance 218a on the data set. The execution of the CB instance 218a on the data set generates, as output, a response encoded in the NMP. The message 224 of FIG. 2B (without the NSH 232) is an example of the response generated by the NMP virtualization engine 206. The NMP virtualization engine 206 converts the response to an impregnated response by inserting, into the response, information identifying the interface of the network element on which to transmit the response. For example, the NMP virtualization engine 206 generates the NSH 232 of FIG. 2D and inserts the header into the request to generate the impregnated request 224 of FIG. 2B (including the NSH header). The information is encoded in a service plane protocol. The NMP virtualization engine 206 transmits the impregnated response to the network element 202a. The network element 202a receives the impregnated response from the NMP virtualization engine 206. The network element 202a converts the impregnated response to the response (i.e., back to the original response) by parsing (from the impregnated response) the NSH, which includes (among other things) information identifying an interface on which to transmit the response. The network element 202a transmits the response to the NMS 102 using the interface identified in the NSH.

Because each of the network elements 202a-n includes SFC and/or NSH protocol code blocks, each maintains its ability to communicate with the NMS 102 by offloading the NMP requests (and the associated processes) to the NMP virtualization engine 206. The NMP virtualization engine 206 can gather data directly from network elements using low-level instructions (e.g., CLI), which are less computationally expensive for the network element than executing the NMP code block. In addition, the NMP virtualization engine 206 can retrieve a data set needed to respond to a NMP request from a memory element that is shared by the virtualization engine 206 and the network elements (e.g., data store 204, which is a shared memory element between network element 202a and the NMP virtualization engine 206).

Figure 5A:
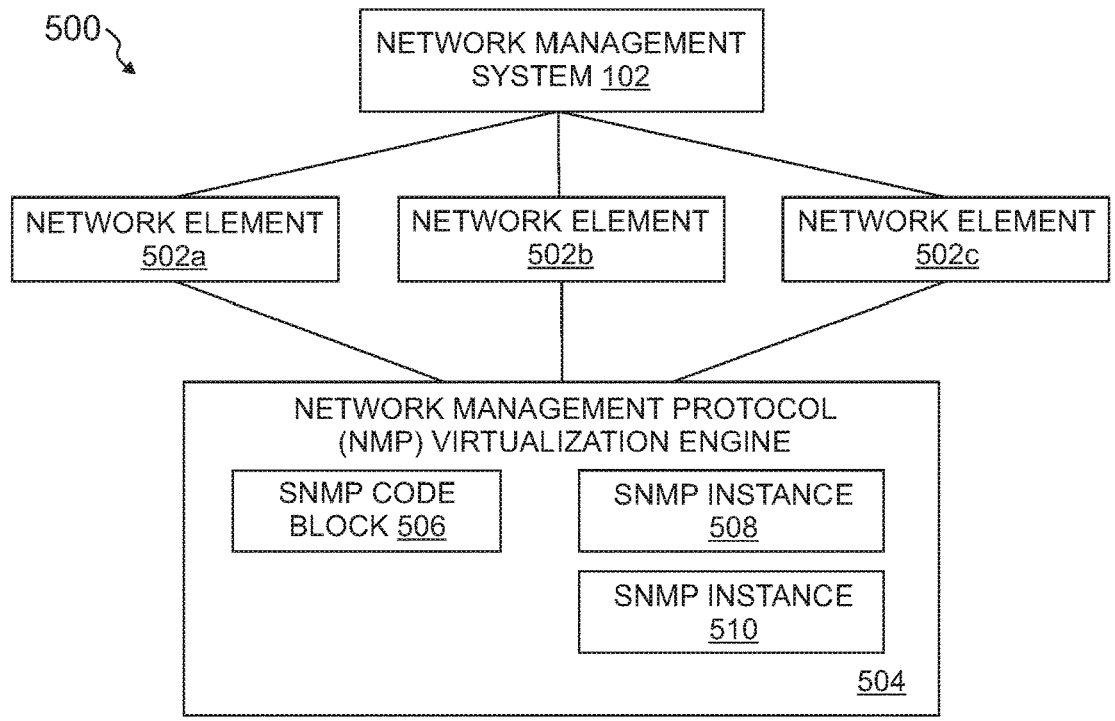
FIGS. 5A and 5B are simplified diagrams of a system in which network management protocols the network elements are replaced using NMP virtualization engine, in accordance with some embodiments of the present disclosure.
Figure 5B:
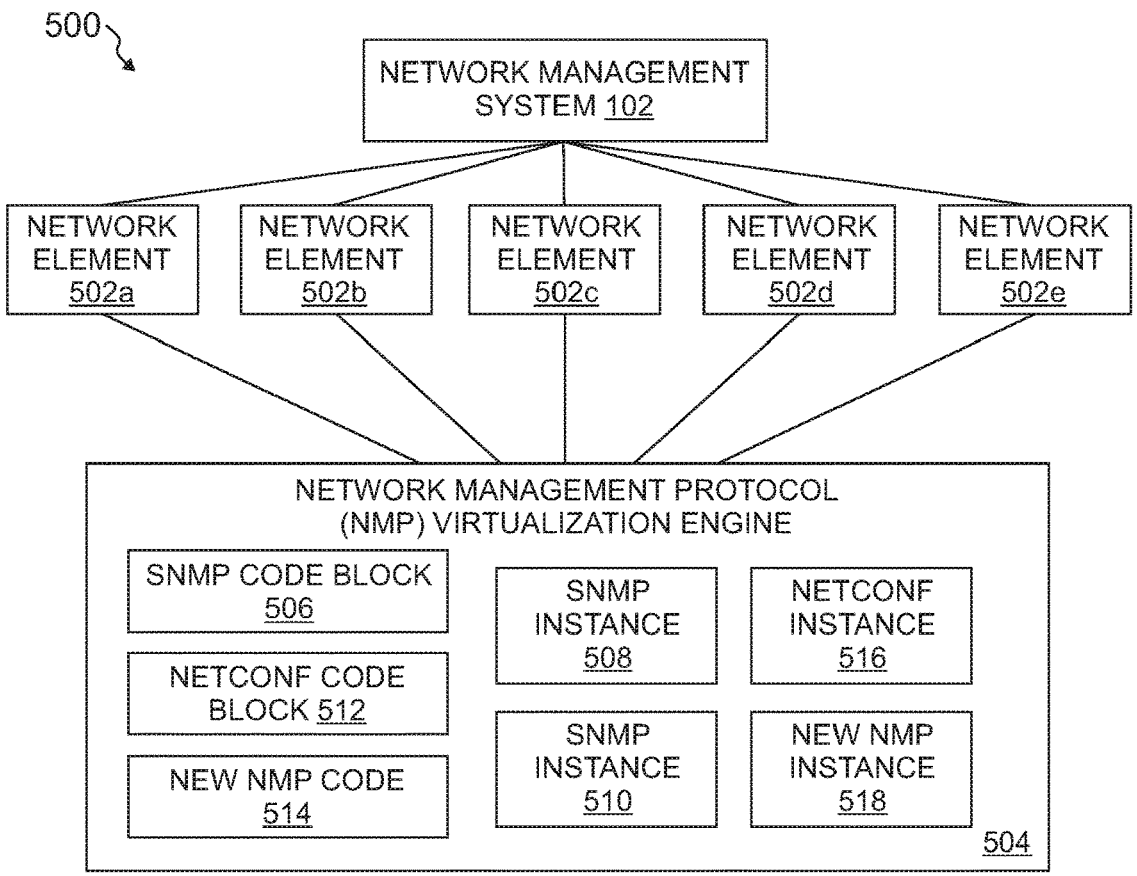

Turning to FIGS. 5A and 5B, FIGS. 5A and 5B are simplified diagrams of a system (i.e., system 500) in which network management protocols, within network elements, are replaced using NMP virtualization engine. Turning to FIG. 5A, in FIG. 5A the system 500 includes a network management system (NMS) 102, a network element 502a, a network element 502b, a network element 502c, and a network management protocol (NMP) virtualization engine 504. The network management system 102 is described with respect to FIG. 1 and each of the network elements 502a-c includes components as described with respect to FIG. 3 or 4; the details of these components are not repeated here only for the purpose of brevity. Several components of the NMP virtualization engine 504 (e.g., processors, CLI handlers, and others described with respect to NMP virtualization engine 206 of FIG. 2A) are not included in the FIG. 5A only for clarity of the Figures.

A NMP virtualization engine can execute one or more instances of a NMP code block (e.g., an agent, which is an example of a service function). The NMP virtualization engine 504 comprises a simple network management protocol (SNMP) code block 506 and executes SNMP instances 508 and 510. Each of the SNMP instances 508 and 510 is an instance of the SNMP code block 506. The SNMP code block is an example of an NMP code block (e.g., an example of NMP code block 214 of FIG. 2A). Each of the SNMP instances 508 and 510 is an example of a CB instances (e.g., similar to CB instances 218a-d of FIG. 2A).

A NMP virtualization engine can expropriate processing of NMP requests for one or more network elements. The NMP virtualization engine 504 uses the SNMP instances 508 and 510 to control processes associated with communicating in SNMP on behalf of the network elements 502a-b. A NMP CB instance (e.g., each of the SNMP instances 508 and 510) can support one or more network elements. In the example of FIG. 5A, the SNMP instance 508 manages (i.e., expropriate processing of NMP requests for) the network element 502a; the SNMP instance 510 manages each of the network elements 502b and 502c. Each of the network elements 502a-c offloads processes associated with communicating in SNMP to a corresponding one of the SNMP instances 508 or 510. Because the NMP virtualization engine 504 provides virtualized network management services to the network elements 502a-c via the SNMP instances 508 and 510, the virtualized network management services can be dynamically scaled based on a change in demand (e.g., based on newly added/removed network elements) by creating (or destroying) SNMP instances. For example, in the FIG. 5B, the system 500 has been updated to includes two new network elements. The NMP virtualization engine 504 can be updated (on the fly, and while running) to include new NMPs (i.e. by added NMP code blocks and/or new NMP CB instances) to support the new network elements.

Turning to FIG. 5B, FIG. 5B illustrates the system 500 of FIG. 5A, except that, in FIG. 5B, the system 500 has been updated to include two new network elements 502d and 502e. The NMP virtualization engine 504 has updated itself (on the fly and while running using Grapevine) to include new NMPs. In particular, the NMP virtualization engine 504 has been updated to include a new two NMP code blocks (i.e., a NETCONF code block 512 and a new NMP code block 514). The NMP virtualization engine 504 is executing an instance of each of the new code blocks (e.g., each run by a thread) and, therefore, the NMP virtualization engine 504 includes CB instances (i.e., a NETCONF instance 516 and new NMP instance 518 corresponding to the NETCONF code block 512 and the new NMP code block 514, respectively). The new NMP code block 514 is a generalized NMP (e.g., left general to support future extensions or newly developed NMPs not currently in existence). In the example of FIG. 5B, the SNMP instance 508 manages the network element 502a; the SNMP instance 510 manages the network element 502c; the SNMP instance 516 manages the network elements 502b and 502d; and the SNMP instance 518 manages the network element 502e. Relative to FIG. 5A, the network element 502b has been updated from communicating with the NMS using SNMP to communicating using NETCONF (i.e., by being updated from being managed by the SNMP instance 510 to being managed by the NETCONF instance 516). Advantageously, each network element is agnostic with respect to the underlying NMP used by the NMP virtualization engine 504. In this example, the network element 502b initially offloads processes to the SNMP instance 510 and, subsequently, the SNMP instance 510 is swapped out for the NETCONF instance 516. Advantageously, the swapping of the SNMP instance 510 for the NETCONF instance 516 for the network element 502b only requires updating the address to which the offloading is directed (i.e., and does not require any change in software, agents, code blocks local to the network element 502b) since the underlying NMP protocol is handled only by the NMP virtualization engine 504. Moreover, any NMP can be used (e.g., new NMPs) including future developed NMPs that do not exist at the time of filing of the present disclosure since the NMP is abstracted from the network element. For example, the network element 502b may receive an additional request from the NMS, wherein the request is encoded in NETCONF (which that is different from the SNMP requests that would have been received in the state of FIG. 5A). In such an example, the network element 502b unloading processes associated with communicating in the NETCONF requires no changes to operation of the unloading by the network element 502b (e.g., uses the same logic for performing the unloading in both cases).

In some cases, the swapping of the SNMP instance 510 for the NETCONF instance 516 for the network element 502b could require some minor changes to the network element 502b. For example, the network element 502b may request, from a registration handler, the address of a different NMP virtualization engine that can handle the new NMP (i.e., resulting in swapping one address for another, replacing a value in a memory element). The network element 502b can reduce the computational resources used by implementing such changes by, e.g., retrieving a full download of all NMP virtualization engines from the registration handler in advance (e.g., during an initial registration process).

Figure 6:
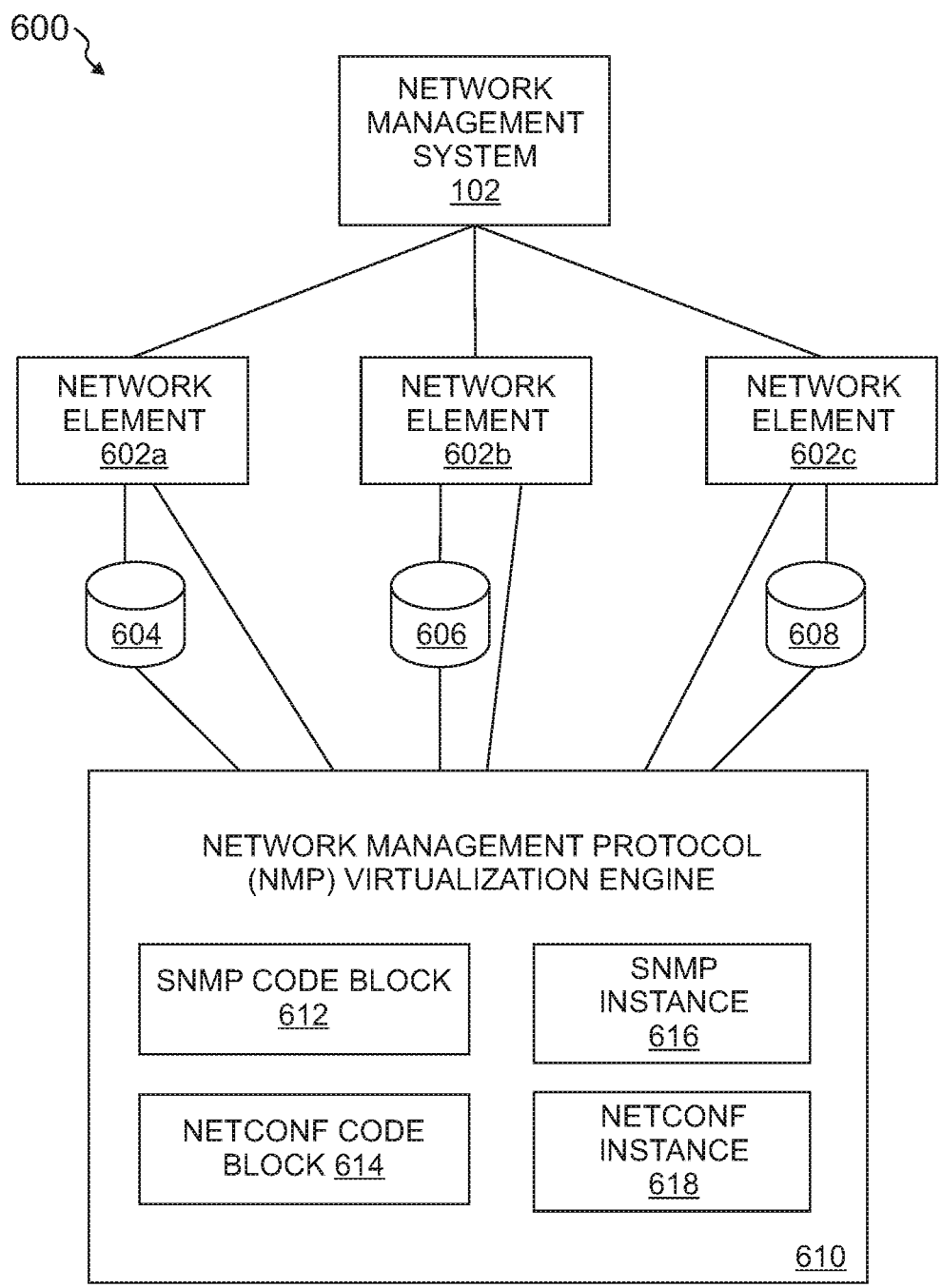
FIG. 6 is simplified diagram of a system in which network elements unload processes associated with a network management protocol using a plurality of data stores, in accordance with some embodiments of the present disclosure.

FIG. 6 is simplified diagram of a system (i.e., system 600) in which network elements unload processes associated with a network management protocol using a plurality of data stores. Turning to FIG. 6, the system 600 includes a network management system (NMS) 102, network elements 602a-c, data stores 604, 606, and 608, and a network management protocol (NMP) virtualization engine 610. Each of the network elements 602a-c is coupled to a corresponding one of the data stores 604, 606, and 608. Each of the data stores 604, 606, and 608 is coupled to the NMP virtualization engine 610. The NMP virtualization engine 610 comprises SNMP code block 612 and NETCONF code block 614 and corresponding SNMP instance 616 and NETCONF instance 618. Each of the data stores 604, 606, and 608 stores state information identifying a states and/or operational status of a corresponding one of the network elements 602a-c. Each of the data stores 604a-c is a database that is accessible by the corresponding network element and the NMP virtualization engine 610. In some examples, each network element periodically updates the data store to represent the correct states and/or operational statuses of the network element. In other examples, each network element maintains, in the data store, a mirror of the states and/or operational status information stored locally on the network element 202a (e.g., the data store is immediately updated whenever a change occurs in the network element). The system 600 of FIG. 6 is substantially similar to the system 500 of FIG. 5. A difference between the system 600 of FIG. 6 and the system 500 of FIG. 5 is that, in the system 600 of FIG. 6, all of the network elements 602a-c are coupled to a data store in. In further examples, any one or more of the separate data stores 602a-c can be further consolidated into a singe, shared data store (i.e., a single data stored used by more than one network element).

Figure 7:
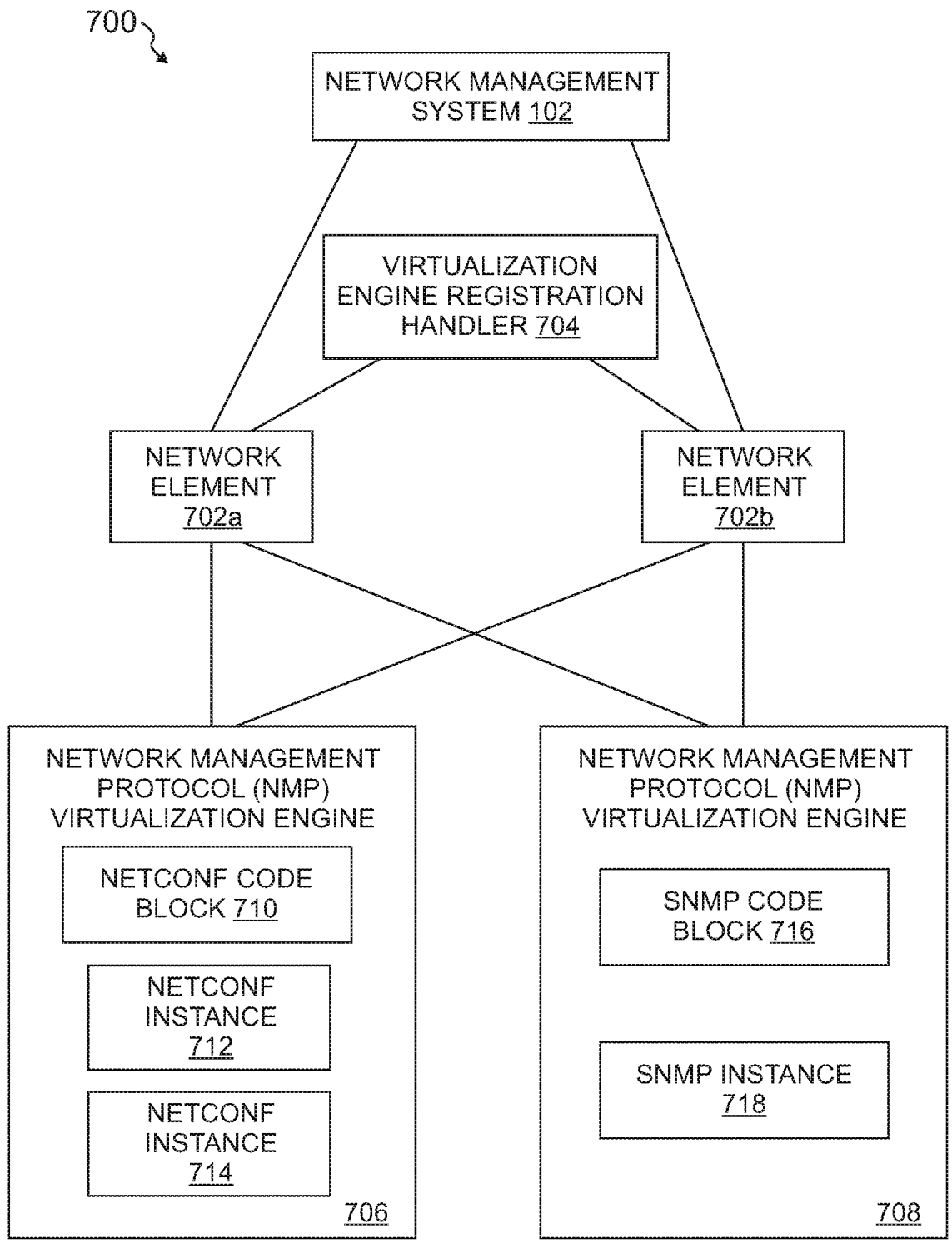
FIG. 7 is a simplified diagram of a system in which network elements use a registration handler, at least in part, to unload processes associated with a network management protocol, in accordance with some embodiments of the present disclosure

FIG. 7 is a simplified diagram of a system (i.e., system 700) in which network elements use a registration handler, at least in part, to unload processes associated with a network management protocol. The system 700 comprises a network management system (NMS) 102, network elements 702a and 702b, a virtualization engine registration handler 704 (the 'registration handler'), and NMP virtualization engines 706 and 708. The network management system 102 is described with respect to FIG. 1 and each of the network elements 702a-b includes components as described with respect to FIG. 3 or 4; the details of these components are not repeated here only for the purpose of brevity. Each of the NMP virtualization engines 706 and 708 is solely dedicated to different network management protocols. The NMP virtualization engine 706 is dedicated to NETCONF while the NMP virtualization engine 708 is dedicated to SNMP. The NMP virtualization engine 706 comprises NETCONF code block 710 and executes NETCONF instances 712 and 714. The NMP virtualization engine 708 comprises SNMP code block 716 and executes SNMP instance 718. The registration handler 704 stores: (1) information that relates a network management protocol to a service function (e.g., a type of CB instance) and (2) information that related the service function to one or more network addresses (e.g., a network address that identifies a virtualization engine that includes the service function). The registration handler 704 is configured to issue a unique identifier (UID) for each network element 702a and 702b during a process of registering each of the network elements. In this example, because each of the NMP virtualization engines 706 and 708 is dedicated to different network management protocols, the registration handler 704 may direct a network element to a particular NMP virtualization engine based on the network management protocol to which the network element responds. For example, if the network element 702a supports NETCONF requests, it will request from the registration handler 704 the address of a virtualization engine that handles NETCONF processes. In response, the registration handler 704 will transmit (to the network element) the network address corresponding to the NMP virtualization engine 706 (which generates responses to NETCONF requests). Likewise, if the network element 702a supports SNMP requests, it will request from the registration handler 704 the address of a virtualization engine that handles SNMP processes. In response, the registration handler 704 will transmit (to the network element) the network address corresponding to the NMP virtualization engine 708 (which generates responses to SNMP requests). By making such requests for virtualization addresses, each network element can load data that identifies network addresses of NMP virtualization engines to which to offload NMP requests.

As described above, each network element loads, from the registration handler 704, data for offloading NMP requests to specific NMP virtualization engines. In some examples, this data is stored in a service function (SF) lookup table (e.g., SF table 312 of FIG. 3). In other examples, this data may be a configuration file that correlates a combination of (Transport protocol and port) with an address of a NMP virtualization engines (e.g., UDP/161 corresponds to an address X of a particular NMP virtualization engine).

The registration handler 704 issues a unique identifier (UID) for each network element 702a and 702b during a process of registering each of the network elements. Each network element is configured with NMP matching criteria (e.g., transport protocol and port number), management protocol name, and the locator ID (e.g., IP address) of the registration handler. The network element transmits a unique ID to the registration handler (e.g., highest Loopback IP) along with configured security credentials. A network element initiates a registration communication with the registration handler 704 by transmitting a message comprising at least one network management protocol (NMP) that the network element supports. For example, if authenticated and authorized, network element transmits the desired management protocol name (e.g., SNMP) to the registration handler. As a result of the initiation message, the registration handler 704 generates the UID for the network element and stores the UID with an association to the at least one NMP. The UID maps the network element to the at least one NMP. The registration handler 704 transmits the UID to the network element. The device will use the UID in its NSH contexts. The UID is used like a pre-shared key. The network element stores the UID with an association to the at least one NMP (or identifier thereof). If the network element supports more than one NMP, the registration handler may issue more than one UID, where each UID relates the network element to one of the more than one NMP. In addition, the network element and registration handler 704 may negotiate parameters for communication of network element state information (e.g., push, pull, hybrid mode of gathering data sets), what protocols the network element supports (types of low-level instructions such as CLI, OS, other) and other data used for controlling communication in a network management protocol. After registration, the network element encapsulates in a NSH protocol header, the UID and an identifier of the interface on which the request was received (e.g., port number on the network element) and inserts the NSH protocol header into any NMP requests that are received from the NMS 102.

During registration, the network element may only retrieve (from the registration handler 704) addresses associated with the network management protocols that it currently supports. Alternatively, the network element may retrieve a full download, where the registration handler 704 transmits (to the network element) information associated with all NMPs that the registration handler supports. Using the full download, the network element can (later, if needed) identify where to send data for other NMPs (e.g., when the NMP underlying the network element is swapped for a different protocol, as described with respect to FIGS. 5A and 5B).

In the example of FIG. 7, the registration handler 704 does not handle service requests (i.e., the registration handler is not a virtualization engine). For scalability, the registration handler 704 could be a scheduler (e.g., loadbalancer, dispatcher, or other network element) that is configured to manage the amount of data traffic assigned to a virtualization engine. However, in other examples, each NMP virtualization engine could also be a registration handler (e.g., one or more of the NMP virtualization engines 706 and 708 may include and be configured to perform functions as described with respect to registration handler 704).

Figure 8:
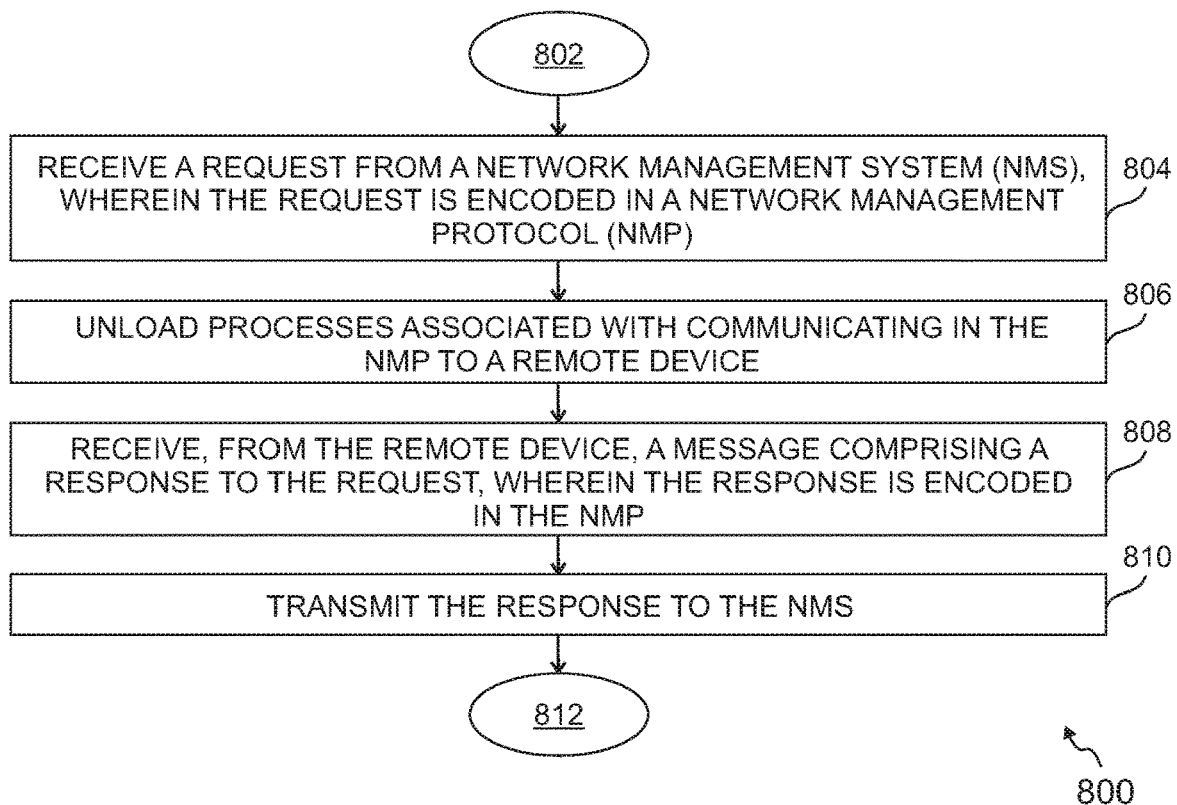
FIG. 8 illustrates an exemplary logic for unloading processes associated with a network management protocol, according to some embodiments of the present disclosure, in accordance with some embodiments of the present disclosure.

FIG. 8 illustrates an exemplary logic (i.e., logic 800) for unloading processes associated with a network management protocol, according to some embodiments of the present disclosure. Procedure 802 may coincide with a start or end point of other logic, routines, and/or applications. In addition, at 802, data (e.g., data structures, objects, values, variables, etc.) may be initialized, retrieved, or accessed for use in logic 800. At 804, a request is received from a network management system (NMS). The request is encoded in a network management protocol (NMP). The request may include a SNMP request (e.g., GetRequest, SetRequest, GetNextRequest, and/or GetBulkRequest as defined in either RFC 1157, SNMPv2, SNMPv3, or derivatives thereof) an NETCONF request (e.g., <get>, <get-config>, <edit-config>, <copy-config>, <delete-config>, <lock>, <unlock>, <close-session>, and/or <kill-session> as defined in RFC 6241), or a request encoded in another network management protocol. At 806, processes associated with communicating in the NMP are offloaded to a remote device. The remote device may be a network element, a NMP virtualization engine or other remote device. The offloading may include generating and transmitting an impregnated request (e.g., similar to message 224 of FIG. 2B including the NSH header 232 of FIG. 2C) to the remote device. At 808, a message comprising a response to the request is received, from the remote device. The response is encoded in the NMP. The data structure may be, for example, a protocol data unit (PDU) (e.g., in the case of SNMP) or an Extensible Markup Language (XML) file (e.g., for NETCONF). As a further example, the message (i.e., an impregnated response) may be a packet comprising an NMP response protocol data unit (PDU) and having, inserted within the message, an NSH protocol header. The message may be a packet and the response may be encoded in an instance of a data structure of the NMP (e.g., impregnated response 224 of FIG. 2B including the NSH header 232 of FIG. 2D). The response may be parsed the message. In some examples, the impregnated response may be converted to a response by parsing, from the impregnated response, the information identifying an interface on which to transmit the response. At 810, the response is transmitted to the NMS. The information is used to identify the port on which to transmit the response to the NMS. The NMS receives the response. The logic 800 ends at 812. 812 may coincide with a start or end point of other logic, routines, and/or applications.

Figure 10A:
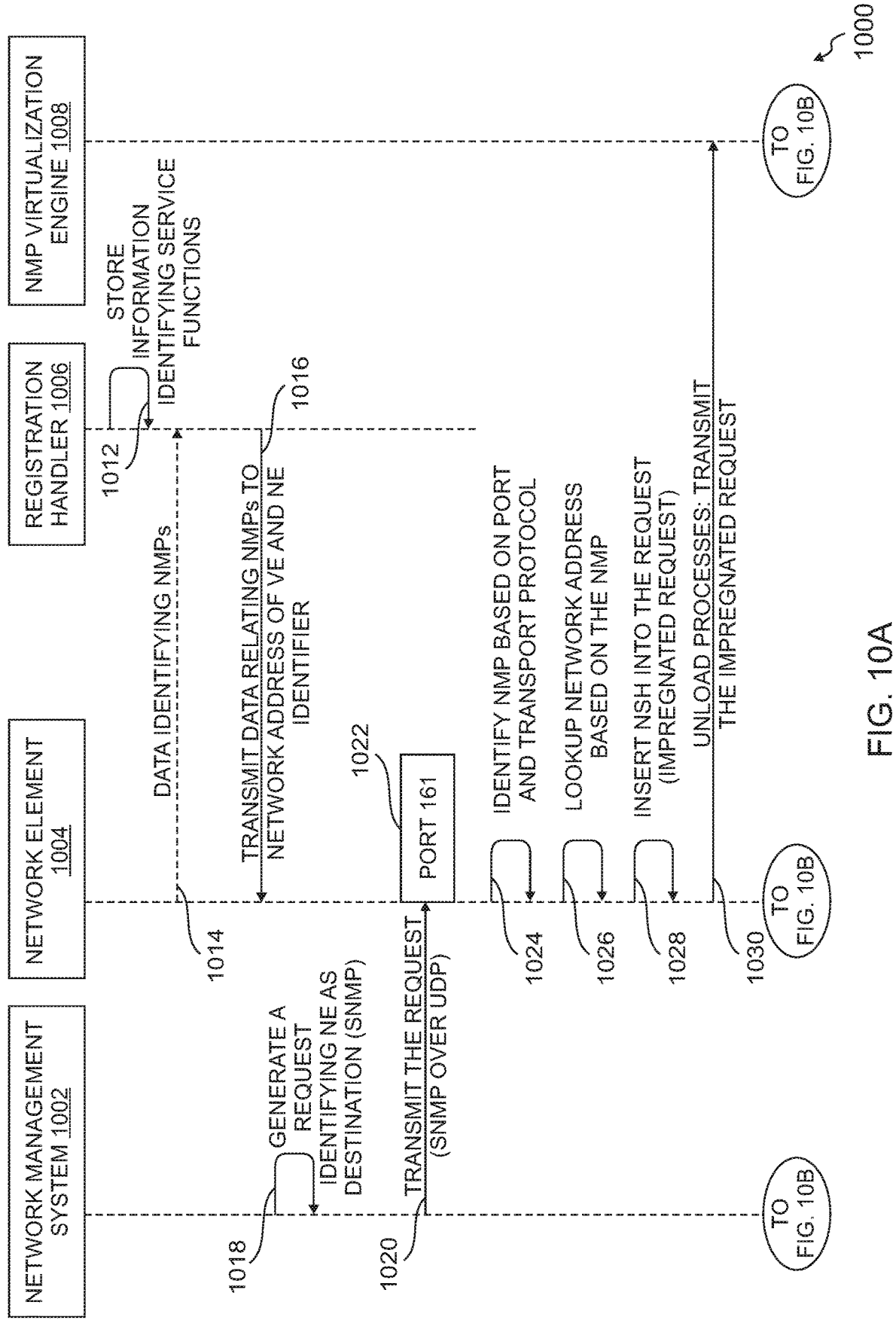

Logic 800 may be implemented in any of network elements 202a-n (of FIG. 2), network element 302 (of FIG. 3), network element 402 (of FIG. 4), network elements 502a-e (of FIGS. 5A and 5B), network elements 602a-c (of FIG. 6), network elements 702a-b (of FIG. 7), and/or network element 1004 (of FIGS. 10A and 10B). For example, a processor (in any of the network elements 202a-n of FIG. 2A) may execute logic 800 to unload processes associated with a NMP to the NMP virtualization engine 206 (via the CB instance 218a) (e.g., as described with respect to FIGS. 2A-D). As another example, the processor 304 (in network element 302 of FIG. 3) may execute logic 800 to unloading processes associated with a network management protocol to a NMP virtualization engine. Advantageously, the network elements can use the logic 800 to offload, to a NMP virtualization engine (i.e., the remote device), the processes required for generating responses to NMP requests. Moreover, because the network element offloads the processes on the backend of the network element, the network management system is unaware that the offloading occurs and, consequently, requires no changes to accommodate the offloading.

Figure 9:
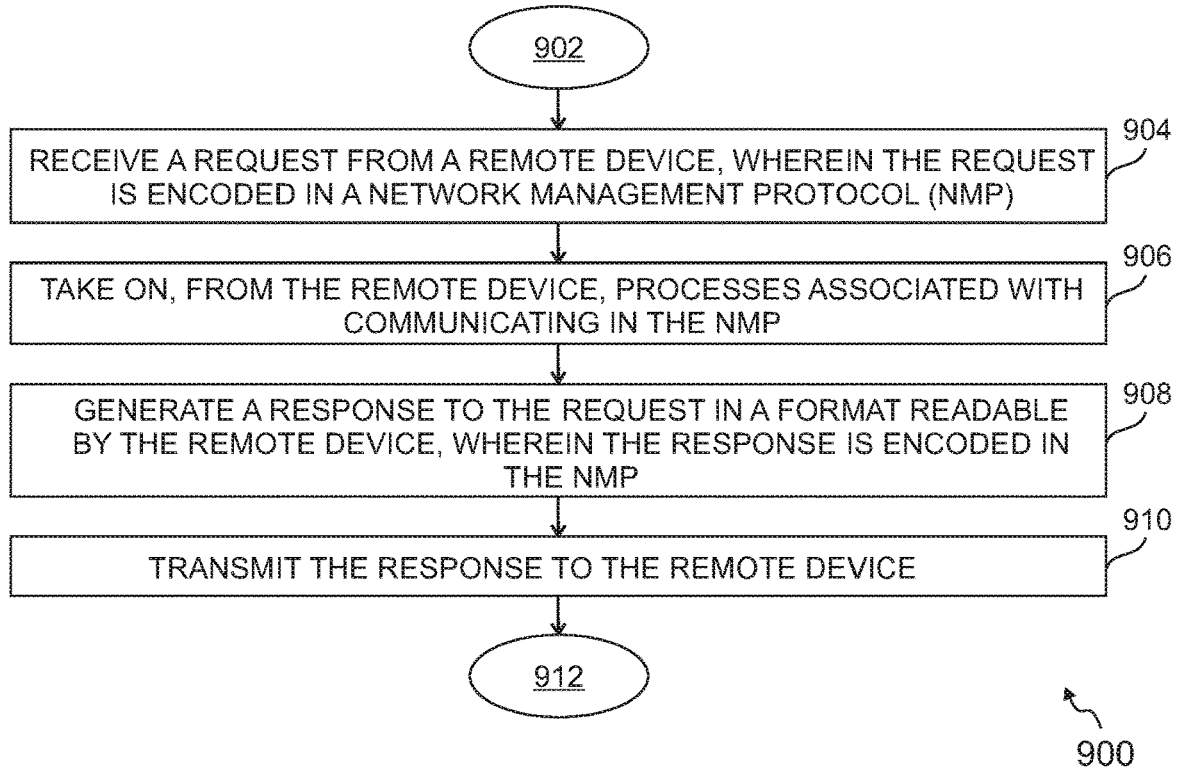
FIG. 9 illustrates an exemplary logic for controlling, on behalf of a network element, processes associated with a network management protocol, in accordance with some embodiments of the present disclosure.

FIG. 9 illustrates an exemplary logic for controlling, on behalf of a network element, processes associated with a network management protocol. Procedure 902 may coincide with a start or end point of other logic, routines, and/or applications. In addition, at 902, data (e.g., data structures, objects, values, variables, etc.) may be initialized, retrieved, or accessed for use in logic 900. At 904, a request is received from a remote device. The request is encoded, at least in part, in a network management protocol (NMP). The remote device may be a network element that neither includes nor executes a NMP code block. In some examples, the request is an impregnated request comprising a request message encoded in the NMP. Moreover, the request message may contain information (encoded in a service plane protocol) that identifies the remote device and an interface of the remote device on which the request was received. At 906, processes associated with communicating in a NMP are taken on from the remote device (i.e., controlled on behalf of the remote device). For example, taking on the processes associated with communicating in the NMP may include executing the NMP code block on behalf of the remote device. At 908, a response to the request is generated in a format readable by the remote device. The response is encoded, at least in part, in the NMP. For example, the response may be encoded in an instance of a data structure of the NMP. The data structure may be, for example, a protocol data unit (PDU) (e.g., SNMP) or an Extensible Markup Language (XML) file (e.g., for NETCONF). As a further example, the response may be an NMP response protocol data unit (PDU). The response may be included in a message (e.g., an impregnated response). The message has, inserted within it, an NSH protocol header. The message may be a packet and the response may be encoded in an instance of a data structure of the NMP (e.g., impregnated response 224 of FIG. 2B including the NSH header 232 of FIG. 2D). The message may have, inserted into it, a NSH protocol header that identifies the remote device and an interface of the remote device on which the request was received. This allows the remote device to remain stateless with respect to the request (e.g., the remote device does not retain state information associated with the request the transmission and may delete such information upon transmitting it). At 910, the response (and/or the message) is transmitted to the remote device. The remote device receives the response. The logic 900 ends at 912. 912 may coincide with a start or end point of other logic, routines, and/or applications.

Logic 900 may be implemented in a component or combination of components of NMP virtualization engine 206 (of FIG. 2A), NMP virtualization engine 504 (of FIGS. 5A and 5B), NMP virtualization engine 610 (of FIG. 6), NMP virtualization engines 706 and 708 (of FIG. 7), and/or NMP virtualization engine 1008 (of FIGS. 10A and 10B). For example, the processor 208 (in NMP virtualization engine 206 of FIG. 2A) may execute logic 900 to control (on behalf of any of the network elements 202*a-n*) processes associated with the NMP. As another example, a processor (in NMP virtualization engine 504 of FIGS. 5A and 5B) may execute logic 900 to control (on behalf of one or more of the network elements 505*a-e*) processes associated with the network management protocol. Advantageously, the NMP virtualization engine can use the logic 900 to control, behalf of a network element, the processes required for generating responses to NMP requests. Moreover, because the network element offloads the processes on the backend of the network element, the network management system is unaware that the offloading occurs and, consequently, requires no changes to accommodate the offloading.

FIGS. 10A and 10B are simplified diagrams of a system (i.e., system 1000) for communicating in a network management protocol. The system 1000 comprises network management system (NMS) 1002, a network element 1004 (comprising port 161 (1022)), a registration handler 1006, a data store 1010, and a NMP virtualization engine 1008. The details (e.g., components and operation) are described throughout the present disclosure and are not repeated here only for the purpose of brevity and clarity of the figures. The data store 1010 stores configuration data that describes the configuration and/or state of the network element 1004. The data in the data store 1010 may be updated and/or retrieved by the network element 1004 (as generally indicated by 1038) and/or may be updated and/or retrieved by the network virtualization engine 1008 (as generally indicated by 1040).

The network element 1004 registers with the registration handler 1006. At 1012, the registration handler 1006 stores information identifying service functions (e.g., information identifying network management protocols (NMPs). In addition, the registration handler 1006 stores a correspondence between NMP virtualization engines and the code block (CB) instances (which implement the NMPs) that the NMP virtualization engines support. At 1014, the network element 1004 transmits (to the registration handler 1006) data identifying NMPs supported by the network element 1004. At 1016, the registration handler 1006 transmits, to the network element 1004, data that relates each of the NMPs to a network address of a NMP virtualization engine that supports the NMPs (i.e., one or more NMP virtualization engines that includes CB instances corresponding to each of the NMPs). The network registration handler 1006 also transmits, to the network element 1004, a unique identifier (UID) assigned by the registration handler to the network element 1004. In some specific examples, communications between network element 1004 and the registration handler 1006 utilize a REST API and are transmitted over HTTP (or HTTPS) protocol.

The NMS 1002 manages the network element 1004 using requests encoded in Simple Network Management Protocol (SNMP). The network element 1004 offloads (e.g. using logic 800) processes for communicating in SNMP to the NMP virtualization engine 1008. The NMP virtualization engine 1008 takes one (e.g. using logic 900) processes for communicating in SNMP on behalf of the network element 1004. Turning to FIG. 10A, at 1018, the NMS 1002 generates a NMP request (the request) that identifies the network element 1004 as a final destination of the request. In this example, the request is encoded in a PDU (a request PDU) of the SNMP protocol. The request may be encoded in an instance of a PDU of SNMP (e.g., message 224 of FIG. 2B excluding the NSH header 232). At 1020, the NMS 1002 transmits the request to the port 161 (1022) of the network element 1004 using UDP transport protocol. A network manager device in the NMS transmits (e.g., using any network interface port) the request to the network element 1004. The network element 1004 receives the request over port 161. At 1024, the network element 1004 identifies the network management protocol based on a combination of the port number on which the request was received and the transport protocol. For example, the network element 1004 may use a lookup table (e.g., see Table 1 of the present disclosure) to identify that the combination of UDP and port 161 corresponds to SNMP protocol. At 1026, the network element 1004 looks up a network address of a virtualization engine that supports the network management protocol (in this case SNMP) (e.g., use the data received from the registration handler 1006 at 1016). In this case, the network element 1004 identifies a network address of the NMP virtualization engine 1008. The network element 1004 generates a NSH that includes the UID of the network element 1004 and an identifier of the port on which the request was received by the network element 1004 (i.e. port 161). For example, the NSH generated by the network element 1004 may be the NSH 232 of FIG. 2C. At 1028, the network element 1004 inserts the NSH protocol header into the request to generate the impregnated request. For example, the impregnated request generated by the network element 1004 may be the impregnated request 224 of FIG. 2B including the NSH 232 of FIG. 2C. At 1030, the network element 1004 unloads processes to the virtualization engine 1008 by, at least in part, transmitting the impregnated request to the NMP virtualization engine 1008. In some examples the impregnated request is transmitted using Virtual Extensible LAN (VXLAN) or extensions thereof (e.g., VXLAN Generic Protocol Extension (VXLAN-GPE)). The network element does not retain information associated with the request (i.e., is stateless, e.g., keeps no record of the UID and the port number used for the particular response). The virtualization engine 1008 receives the impregnated request from the network element 1004.

Turning to FIG. 10B, at 1032, NMP virtualization engine 1008 parses the NSH protocol header from the impregnated request to re-create the original request. The NMP virtualization engine 1008 stores at least a portion of the information parsed from the NSH header (e.g., for later use in identifying the port on which the response should be transmitted by the network element 1004). At 1034, the NMP virtualization engine 1008 identifies a data set needed to generate a response to the request. For example, the NMP virtualization engine 1008 may include a table that identifies the data set needed for each type of request of the NMP. At 1036, the virtualization engine retrieves the data set needed to generate the response to the request. In this example, the NMP virtualization engine 1008 can either use the data store 1010 to retrieve the data set (as generally indicated by 1040). Alternatively, at 1042, the NMP virtualization engine 1008 may transmit a CLI command (or any low-level instruction) to the network element 1004 to retrieve the data set. Instructions may be sent using NETCONF over SSH or TLS, CLI over SSH, or any other reliable transport protocol that the network element 1004 supports. At 1044, the virtualization engine 1008 executes one or more processes to generate the response to the request based on the data set. The one or more processes may include processes defined in a NMP code block or instance thereof. The response is encoded in the same NMP that as the request (i.e., the request generated by the NMS 1002 at 1018). In this example, the response is encoded in PDU (a response PDU) of SNMP. The NMP virtualization engine 1008 generates an NSH protocol header. For example, the NSH generated by the NMP virtualization engine 1008 may be the NSH 232 of FIG. 2D. The NSH identifies the port (i.e., port 161) on which the request was received by the network element 1004 (e.g., later used to identify the port on which the response should be transmitted by the network element 1004). At 1046, the NMP virtualization engine 1008 inserts the NSH protocol header into the response to generate the impregnated response. For example, the impregnated response generated by the NMP virtualization engine 1008 may be the impregnated request 224 of FIG. 2B including the NSH 232 of FIG. 2D. At 1048, the NMP virtualization engine 1008 transmits the impregnated response to the network element 1004. In some examples the impregnated response is transmitted using Virtual Extensible LAN (VXLAN) or extensions thereof (e.g., VXLAN Generic Protocol Extension (VXLAN-GPE)). The network element 1004 receives the impregnated response from the NMP virtualization engine 1008. At 1050, the network element 1004 parses the NSH protocol header from the impregnated response to generate (or re-create), the original response. In addition, the network element 1004 uses the information in the NSH to identify the port on which the response should be transmitted by the network element 1004 (e.g., in this case port 161). At 1052, the network element 1004 transmits the response to the NMS 1002 over UDP using the port 161. In some embodiments, the network element 1004 transmits the response to the same port on the manager device in the NMS 1002 as was used to send the request at 1020 (i.e., does not need to be sent to port 161 on the manager device).

In the examples described above (e.g., with respect to FIGS. 10A and 10B), a NMS (e.g., a network manager device or other device in the NMS) explicitly solicits a response from a network element, for example, by sending a request (i.e., the explicit solicitation) to the network element. In response to the request, the network element generates a response (e.g., encoded in a NMP) and transmits it to the network manager device. In such cases, responses directly correspond to requests. In other words, the responses and the requests are synchronous (coordinated with one another) and correspond on a one-to-one basis. However, in other examples, messages sent by the network element can be asynchronous in the sense that they are not in direct response to a request and, in general, do not correspond on a one-to-one basis with requests. Such asynchronous messaging enables some embodiments of the present disclosure to be used in a deployment stack where messages cover the full breadth of messages in a NMP including both synchronous and asynchronous and bidirectional communications (e.g., messages initiated by the NMS and/or messages initiated by a device managed by the NMS).

In the context of a network management system (NMS), an asynchronous message (e.g., an asynchronous message encoded in the NMP of the NMS, i.e., an asynchronous NMP message is inclusive of any message generated by a managed device (e.g., a network element managed by the NMS) independent of a manager device (e.g., a network manager device in the NMS) (e.g., not in direct response to an individual request). An asynchronous NMP message can be event-driven (e.g., generated based on detection of an occurrence of a condition). For example, a condition can include a time value (e.g., periodically generated after expiration of a period of time, after a timeout interval, and the like), an event (e.g., a system event defined by a NMS, an error condition defined by a network management system, an operational state of a device, a change in operational state of a device, and/or a combination of the foregoing), or an occurrence of any other detectable condition that is independent of a message sent by a network manager device.

An asynchronous NMP message may be solicited or unsolicited. Solicited messaging is inclusive of, for example, a publisher-subscriber model of message generation and transmission. In a publisher-subscriber model, one device or component (i.e., the publisher) is configured to detect an event (or other condition). Other devices or components (i.e., the subscriber or subscribers, as the case may be) explicitly subscribe to the event and, as subscribers, are notified (e.g., using a notification message) by the publisher when the event is detected. The subscriber may register directly with the publisher (e.g., by sending a message to the publisher that requests notifications from the publisher) or a system that manages the publisher (e.g., sending, to another device, a message that requests notifications from the publisher). When the publisher detects the event, the publisher broadcasts the message to all subscribers of the event. Unsolicited messaging is inclusive of (default) notifications. In a notification model, one device or component (the publisher) is configured to detect an event (or other condition). The publisher notifies other devices or components when the event is detected even though such other devices or components did not explicitly subscribe to the event (e.g., default NMP settings that implicitly subscribes the other devices or components to the event, system-level events, error conditions, and the like). In other examples, a device in a NMS may explicitly subscribe another device (or all devices in a network) to the event (e.g., an administrator-defined default setting). In SNMP, an asynchronous message may be any SNMP notification (e.g., a Trap as defined in either RFC 1157, SNMPv2, SNMPv3, or a derivative thereof and/or an InformRequest as defined in SNMPv2, or a derivative thereof). In particular, Trap and InformRequests are notification types may be used to notify a device regarding a detection of a change in operational state (i.e., an unsolicited asynchronous NMP message). The IETF first published in 2014 an Internet Draft document titled, Requirements for Subscription to YANG Datastores, which provides requirements for a service that allows client applications to subscribe to updates of a YANG datastore (i.e., a publisher-subscriber model). 'YANG pub/sub' as used herein refers to the Internet Draft document titled Requirements for Subscription to YANG Datastores (draft-ietf-i2rs-pub-sub-requirements) or any derivatives thereof (e.g., RFCs and/or standardized versions). In NETCONF, an asynchronous message may be an update (e.g., using YANG data) as defined in YANG pub/sub.

A network element can offload, to a virtualization engine, processes associated with generating an asynchronous NMP message (e.g., using procedures similar to those described with respect to 806, 808, and 810 of FIG. 8). The virtualization engine expropriates, from the network element, the processes associated with generating the asynchronous NMP message (e.g., using procedures similar to those described with respect to 906, 908, and 910 of FIG. 9). For example, taking on the processes associated with generating an asynchronous NMP message may include, among other things, the virtualization engine generating the asynchronous NMP message based on detection of a condition and/or executing the NMP code block on behalf of the remote device. Advantageously, the asynchronous NMS message is generated by the virtualization engine and is transmitted to the network element using the SFC via NSH mechanism disclosed herein. The network element then relays the asynchronous NMP message back to the NMS (e.g., a network manager device in the NMS). From the perspective of the NMS, it appears that the network element is the sole source of the asynchronous NMP message (though the asynchronous NMP message was actually generated by the virtualization engine).

The virtualization engine generates the asynchronous NMP message (on behalf of the network element) based on detection of a condition. The virtualization engine can directly detect an occurrence of the condition or may receive an indication (e.g., an alert) of an occurrence of the condition. For example, the virtualization engine may access a memory element to determine an operational state of the network element. Using operational status information (e.g., stored in a shared database or retrieved using low-level commands), the virtualization engine can directly detect a change in the operational state of the network element (e.g., a communication link that was previously operational is not operational, is "down"). In some implementations, the virtualization engine may use low-level commands to determine an operational state of the network element. In other implementations, the virtualization engine may directly access a data store that is shared with the network element. Both using low-level commands and directly accessing a shared data store fall within the scope of accessing a memory element coupled to the network element. Alternatively, the network element may directly detect the change in the operational state (for itself) and alert the virtualization engine of the change in the operational state of the network element (e.g., using a message, packet, ping or other alert). In such an example, the virtualization engine does not directly detect the change in the operational state of the network element and, instead, is alerted to the change by the network element. In either case (whether the virtualization engine directly detects the change or is alerted to the change), the virtualization engine generates the asynchronous NMP message. When the virtualization engine directly detects the change in the operational state of the network element, the virtualization engine generates the asynchronous NMP message (on behalf of the network element) in response to detecting the change. When the virtualization engine is alerted regarding the change in the operational state of the network element, the virtualization engine generates the asynchronous NMP message (on behalf of the network element) in response to receiving the alert. Thus, the network element can detect the condition (and alert the virtualization engine) or offload detection of the condition to the virtualization engine. In either case, the virtualization engine detects that a change in operational state associated with a network element (e.g., where the detection is based on the alert or by directly detecting the change). The virtualization engine is to notify a remote device of the change in the operational state of the network element (e.g., alert a network manager device in the NMS (which is described further below).

A network management protocol (NMP) may identify (or otherwise specify, require, stipulate, or instruct) that a device is to be notified of a particular condition (e.g., a change in the operational state, to follow the above example). For example, the NMP may define conditions for which a network manager device in a network management system (NMS) should be notified. In systems where no virtualization engine (as disclosed herein) exists, a network element directly generates and transmits such notifications to the network manager device when an occurrence of the condition is detected. However, when a virtualization engine takes on (e.g., controls) processes associated with communicating in the NMP on behalf of the network element, the virtualization engine generates a message in response to detecting any such NMP-defined conditions. For example, the virtualization engine identifies, based on the change in operational state and the NMP, a data set associated with generating a message to notify the device of the change in the operational state. The data set may include information identifying: states, operational statuses, the change in the operational state or, or any other condition describing the network element.

After identifying the data set needed to generate the message to notify the device of the change in the operational state, the virtualization engine accesses (or retrieves) the data set from a memory element coupled to the network element. In some implementations, the virtualization engine may use low-level commands to retrieve the data set from the memory element local to the network element (e.g., a local storage device). In other implementations, the virtualization engine may directly access a data store that is shared with the network element (e.g., the data store being coupled to the network element and the virtualization engine, e.g., over a network). Both using low-level commands and directly accessing a shared data store fall within the scope of accessing a memory element coupled to the network element. Regardless of the approach to doing so, the virtualization engine gathers, from the network element, the data set needed to generate the message to notify the device of the change in the operational state.

The virtualization engine is to generate the message encoded in the NMP (e.g., since the message is required by the NMP). Thus, the virtualization engine executes, on the data set, an instance of a code block (CB) to generate the message. The instance of the code block may be an instance of a NMP code block (or an agent) similar to CB instance 218a described with respect to FIG. 2A. When executed, the instance of the CB outputs the message encoded at least in part, in the NMP. For example, the message may be encoded, at least in part, in an instance of a data structure of the NMP. The data structure may be, for example, a protocol data unit (PDU) (e.g., SNMP) or an Extensible Markup Language (XML) file (e.g., for NETCONF). As a further example, the message may be an NMP protocol data unit (PDU). The NMP data structure is a format that is readable by the device to be notified.

The virtualization engine generates a network service header (NSH) (e.g., according to the NSH draft) for adding to the message. For example, the NSH generated by the virtualization engine may be the NSH 232 of FIG. 2D. The NSH identifies a network address of a device and a port (e.g., port 162) to which the message is to be transmitted on the device (i.e., on the device in the NMS to which the message is to be sent). The virtualization engine inserts the network service header into the message to generate an impregnated message. For example, the impregnated message generated by the NMP virtualization engine may be the impregnated message 224 of FIG. 2B including the NSH 232 of FIG. 2D. The virtualization engine transmits the impregnated message to the network element.

The network element receives the impregnated message from the NMP virtualization engine. The network element parses the NSH protocol header from the impregnated message to generate (or re-create), the original message. In addition, the network element uses the information in the NSH to identify the device to be notified and the port to which the message is to be transmitted. For example, the device may be a network manager device (in a NMS) that is programmed to receive asynchronous NMP messages regarding the change in operation state and the port may be a port one the network manager device at which network manager device the is programmed to receive any asynchronous NMP messages. The network element transmits the message to the device. The network element transmits the message to the port on the device that is identified in the NSH (e.g., port 162).

Within simple network management protocol (SNMP), a trap (e.g., as defined in either RFC 1157, SNMPv2, SNMPv3) is an example of an asynchronous NMP message. For example, link up/down traps may be used to notify a network manager device in the NMS regarding a condition related to the operational state of a link on the network element (i.e., whether the link is up or down). What follows is an example of a SNMP link up/down trap in the context of system 1000 of FIGS. 10A and 10B.

Turning to FIG. 10A, at 1018, the NMS 1002 (e.g., a network manager in the NMS 1002) generates an SNMP SetRequest that is to enable the link up/down traps on the network element 1004. The SetRequest subscribes the NSM 1002 to receive notifications (in this case traps) regarding the operational status of the link on the network element 1004. The SetRequest may identify a device (e.g., the network manager device in the NMS 1002) that is to be notified of when the link changes operational state (e.g., from up to down or from down to up). At 1020, the NMS 1002 transmits the SNMP SetRequest to the network element 1004. The SNMP SetRequest is a request and, therefore, can be passed to the NMP virtualization engine 1008 just as any other request (e.g., using logic 800 (FIG. 8) and/or performing procedures 1024, 1026, 1028, and 1030 (FIG. 10A)). The NMP virtualization engine 1008 receives an impregnated SetRequest from the network element 1004 at 1030.

Turning to FIG. 10B, at 1032, the NMP virtualization engine 1008 parses the NSH from the impregnated SetRequest. The NMP virtualization engine 1008 uses the identity (e.g., a network address and/or port number) of the device from the NSH to set a flag (e.g., in its internal memory element) that indicates that traps are to be sent for link up/down conditions on the network element 1004. At 1034, identifies the data set needed to generate a message notifying the NMS of a link up/down condition (e.g., identify of data fields that must input to an instance of an NMP code block to output a trap message encoded in the NMP). Information identifying the data set may be stored with the flag.

The NMP virtualization engine 1008 may not immediately generate and send a message back to the NMS 1002 via the network element 1004. Instead, the NMP virtualization engine 1008 may hold (e.g., in a loop) until it detects the change in an operational state of the link of the network element 1004 (as described above with respect to generating the asynchronous NMP message based on detection of a condition). Notifying the NMS 1002 with traps based on a subscription (SetRequest) is an example of a solicited asynchronous NMP message. In other cases where the message is unsolicited, a NMP default setting (offloaded to a virtualization engine) identifies conditions for which a NMP manager device should be notified via traps or other asynchronous NMP messages (a system default). Thus, the NMP virtualization engine 1008 hold based only on default information from the NMP (and not based on any explicit solicitation from the network element 1004). In still other embodiments, the network manager device configures the NMP virtualization engine 1008 to generate notifications for all network elements in the system 1000 so that link up/down traps will be sent for all network elements registered with the NMP virtualization engine 1008 (a user-set default).]

The NMP virtualization engine 1008 may hold (e.g., in a loop) until it detects the change in an operational state of the link of the network element 1004. For example, the NMP virtualization engine 1008 may detect that the link changes from up to down (i.e., goes down). In response to the detection of the change in operational state, the NMP virtualization engine 1008 identifies, based on the change in operational state and the NMP, the data set associated with generating the message to notify the NMS 1002 of the change in the operational state. For example, the NMP virtualization engine 1008 can use the flag to identify that the NMS 1002 is to be notified of the change in the operational state and a port on a device in the NMS to send the message. The NMP virtualization engine 1008 accesses a memory element coupled to the network element 1004 (e.g. either accessing 1010 via 1040 or using low-level commands at 1042) to retrieve the data set needed to generate the message notifying the NMS 1002 of a link up/down condition (in this example link down).

At 1044, the virtualization engine 1008 executes one or more processes to generate a notification message notifying the NMS 1002 of a link up/down condition based on the data set. The one or more processes may include processes defined in a NMP code block or instance thereof. The notification message is encoded in the same NMP that as the request (i.e., the SetRequest generated by the NMS 1002 at 1018 or the NMP in which the default setting is defined). In this example, the notification message is encoded, at least in part, in a trap PDU of SNMP. The NMP virtualization engine 1008 generates a network service header (NSH). For example, the NSH generated by the NMP virtualization engine 1008 may be the NSH 232 of FIG. 2D. The NSH identifies a network address of the NMS 1002 (e.g., a network manager device in the NMS) and a port to which the message is to be transmitted (e.g., on the network manager device to which the message is to be sent). At 1046, the NMP virtualization engine 1008 inserts the NSH protocol header into the message to generate impregnated notification message. For example, the impregnated notification message generated by the NMP virtualization engine 1008 may be the impregnated request 224 of FIG. 2B including the NSH 232 of FIG. 2D. At 1048, the NMP virtualization engine 1008 transmits the impregnated notification message to the network element 1004. The network element 1004 receives the impregnated notification message from the NMP virtualization engine 1008. At 1050, the network element 1004 parses the NSH protocol header from the impregnated notification message to generate (or re-create), the original notification message (e.g., the trap PDU). In addition, the network element 1004 uses the information in the NSH to identify the network address of the NMS 1002 and the port to which the message is to be transmitted. At 1052, the network element 1004 transmits the notification message to the port on the NMS 1002 (identified in the NSH).

It is noted that, for asynchronous NMP messages, the port from which the network element 1004 transmits the messages is unspecified. However, the port to which the network element 1004 transmits the message is specified. This is because the NMS may "listen" for asynchronous messages on a particular port and, therefore, the network element 1004 must use this port for sending any asynchronous NMP messages to ensure that the messages are "heard" (e.g., received and acted upon by the NMS).

The above procedures for taking on asynchronous NMP messages (e.g., 1036-1052) may be repeated each time the NMP virtualization engine 1008 detects the change in operational condition. Thus, several asynchronous NMP messages may be sent using the SFC via NSH mechanism based on a single solicitation or based on a single default setting (unsolicited).

The term 'endpoint' is inclusive of devices used to initiate a communication, such as a computer, a personal digital assistant (PDA), a laptop or electronic notebook, a cellular telephone (e.g., an IPHONE, an IP phone, a BLACKBERRY, a GOOGLE DROID), a tablet (e.g., an IPAD), or any other device, component, element, network element, or object capable of initiating voice, audio, video, media, and/or data exchanges within the communication systems disclosed herein (e.g., network 100, network 200, and/or systems 500, 600, 700, and/or 1000). An endpoint may also be inclusive of a suitable interface to the human user, such as a microphone, a display, or a keyboard or other terminal equipment. An endpoint may also be any device that seeks to initiate a communication on behalf of another entity or element, such as a program, a conferencing device, a database, or any other component, device, element, or object capable of initiating an exchange within the communication systems disclosed herein (e.g., network 100, network 200, and/or systems 500, 600, 700, and/or 1000). Furthermore, endpoints can be associated with individuals, clients, customers, or end users.

In one implementation, the network elements, NMP virtualization engines, registration handlers, and/or network management systems described herein may include software to achieve (or to foster) the functions discussed herein for enabling migration of processes associated with a network management protocol where the software is executed on one or more processors to carry out the functions. This could include the implementation of instances of code blocks, NMP offloading modules, NMP controlling modules and/or any other suitable element that would foster the activities discussed herein. Additionally, each of these elements can have an internal structure (e.g., a processor, a memory element, etc.) to facilitate some of the operations described herein. In other embodiments, these functions for migrating/offloading processes associated with the network management protocol may be executed externally to these elements, or included in some other network element to achieve the intended functionality. Alternatively, network elements and/or NMP virtualization engines may include software (or reciprocating software) that can coordinate with other network elements in order to achieve the offloading or controlling of processes associated with the network management protocol described herein. In still other embodiments, one or several devices may include any suitable algorithms, hardware, software, components, modules, interfaces, or objects that facilitate the operations thereof.

In certain example implementations, the network management functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as data stores to enable processes associated with a network management protocol as disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Additionally, it should be noted that with the examples provided above, interaction may be described in terms of two, three, or four network elements; one, two, or three NMP virtualization engines; one, two, or three NMP data stores. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of offloading network management activities, as potentially applied to a myriad of other architectures.

It is also important to note that the procedures in the FIGS. 8, 9 and 10 illustrate only some of the possible scenarios that may be executed by, or within, the network elements, NMP virtualization engines, registration handlers, and/or network management systems described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network elements, NMP virtualization engines, registration handlers, and/or network management systems in that other suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The following Examples relate to some embodiments of the present disclosure:

Example 1 is a method comprising: receiving, by a network element, a request from a network management system (NMS), wherein the request identifies the network element as a final destination of the request and is encoded in a network management protocol (NMP); unloading, by the network element to a virtualization engine, processes associated with communicating in the NMP by: converting the request to an impregnated request by inserting into the request information identifying the network element and an interface of the network element on which the request was received, wherein the information is encoded in a service plane protocol, and transmitting the impregnated request to the virtualization engine.

In Example 2, the subject matter of Example 1 can optionally include receiving, from the virtualization engine, a response to the impregnated request, the response being encoded, at least in part, in the NMP; and transmitting, by the network element, the response to the NMS.

In Example 3, the subject matter of Example 1 or 2 can optionally include the information identifying the network element and the interface of the network element on which the request was received being a first information, and can optionally include the receiving the response to the impregnated request comprises: receiving, from the virtualization engine, an impregnated response to the impregnated request, the impregnated response comprising the response encoded in the NMP and having, within the response, second information identifying an interface on which to transmit the response, and wherein the second information is encoded in the service plane protocol; and wherein the transmitting the response to the NMS comprises transmitting the response to the NMS on the interface on which to transmit the response.

In Example 4, the subject matter of any of Examples 1-3 can optionally include a code block that implements the NMP and the code block being operable to generate responses to requests that are encoded in the NMP, and wherein the network element lacks the code block that implements the NMP and the virtualization engine is to execute at least one instance of the code block that implements the NMP.

In Example 5, the subject matter of any of Examples 1-4 can optionally include, upon unloading the processes associated with communicating in the NMP, the network element does not retain state information associated with the request.

In Example 6, the subject matter of any of Examples 1-5 can optionally include the NMP being a first NMP, and can optionally include receiving, by the network element, an additional request from the NMS, wherein the request is encoded in a second NMP that is different from the first NMP, and wherein unloading processes associated with communicating in the second NMP requires no changes to operation of the network element.

In Example 7, the subject matter of any of Examples 1-6 can optionally include the unloading the processes associated with communicating in the second NMP requiring no changes to operation of the network element comprising: unloading, by the network element to the virtualization engine, the processes associated with communicating in the second NMP being the same as the unloading, by the network element to the virtualization engine, the processes associated with communicating in the first NMP.

In Example 8, the subject matter of any of Examples 1-7 can optionally include, prior to the transmitting the response to the NMS on the interface on which to transmit the response, converting the impregnated response to the response by parsing, from the impregnated response, the second information and identifying, based on the second information, the interface on which to transmit the response.

In Example 9, the subject matter of any of Examples 1-8 can optionally include the first information being encoded in the service plane protocol comprises the first information being encoded into a first instance of a header defined by the service plane protocol and the second information being encoded in the service plane protocol comprises the second information being encoded into a second instance of the header defined by the service plane protocol.

In Example 10, the subject matter of any of Examples 1-9 can optionally include the header defined by the service plane protocol being a network service header defined by a service function chaining protocol, and wherein the first information being encoded into the first instance of the network service header defined by the service function chaining protocol comprises: encoding the first information into a field of the first instance of the network service header, and the second information being encoded into the second instance of the network service header defined by the service function chaining protocol comprises: encoding the second information into the field of the second instance of the network service header.

In Example 11, the subject matter of any of Examples 1-10 can optionally include the first information identifying the network element and the interface of the network element on which the request was received comprising a unique identifier of the network element and an identifier of the interface on which the request was received, and wherein the converting the request to the impregnated request by inserting into the request the first information comprises: encoding, into the first instance of the header defined by the service plane protocol, encoding the unique identifier of the network element and the identifier of the interface on which the request was received; and inserting the first instance of the header defined by the service plane protocol into the request to generate the impregnated request.

In Example 12, the subject matter of any of Examples 1-11 can optionally include the request being encoded in the NMP comprising the request being encoded in an instance of a data structure of the NMP; and wherein the converting the request to the impregnated request by inserting into the request the first information comprises inserting the first information into the instance of the data structure to generate the impregnated request.

In Example 13, the subject matter of any of Examples 1-12 can optionally include the response being encoded in the NMP comprising the response being encoded in an instance of a data structure of the NMP; and wherein the impregnated response having, within the response, the second information identifying comprises the impregnated response having the second information within the instance of the data structure.

In Example 14, the subject matter of any of Examples 1-13 can optionally include the request and the response being encoded in a same NMP.

In Example 15, the subject matter of any of Examples 1-14 can optionally include the request and the response being encoded in a standardized network management protocol.

In Example 16, the subject matter of any of Examples 1-15 can optionally include the data structure of the NMP being one selected from the group consisting of a protocol data unit (PDU) of Simple Network Management Protocol (SNMP) and an Extensible Markup Language (XML) file of Network Configuration Protocol (NETCONF).

In Example 17, the subject matter of any of Examples 1-16 can optionally include the data structure of the NMP being one selected from the group consisting of a protocol data unit (PDU) of Simple Network Management Protocol (SNMP) and an Extensible Markup Language (XML) file of Network Configuration Protocol (NETCONF).

In Example 18, the subject matter of any of Examples 1-17 can optionally include, prior to the receiving the request from the NMS: receiving, by the network element, a unique identifier of the network element and a service function lookup data structure that associates one or more network management protocols (NMPs) with a corresponding one or more virtualization engines.

In Example 19, the subject matter of any of Examples 1-18 can optionally include the service function lookup data structure that associates the one or more NMPs with the corresponding one or more virtualization engines comprising: a first data structure portion storing a correspondence between one or more identifiers associated with a corresponding one or more interfaces of the network element and a transport protocol, and the one or more NMPs; a second data structure portion storing the one or more NMPs and correspondence with one or more service functions; and a third data structure portion storing one or more service functions and correspondence with addresses of one or more virtualization engines that executes an instance of a corresponding service function.

In Example 20, the subject matter of any of Examples 1-19 can optionally include the unloading the processes associated with generating the response to the NMP request message to the virtualization engine further comprising: identifying, from the service function lookup data structure, an address of the virtualization engine, wherein the virtualization engine executes an instance of a service function that corresponds to the NMP in which the request is encoded.

Example 21 is an apparatus comprising: a network interface comprising a plurality of ports, the network interface being to receive, on a port of the plurality of ports, a request from a network management system (NMS), wherein the request identifies the apparatus as a final destination of the request and is encoded in a network management protocol (NMP), and transmit an impregnated request to a virtualization engine; a memory element to store code; at least one processor coupled to the memory element and network interface, wherein the at least one processor is to execute the code to perform operations comprising: unloading, to the virtualization engine, processes associated with communicating in the NMP by: converting the request to an impregnated request by inserting into the request information identifying the apparatus and the port on the network interface on which the request was received, wherein the information is encoded in a service plane protocol.

In Example 22, the subject matter of Example 21 can optionally include the network interface being further to: receive, from the virtualization engine, a response to the impregnated request, the response being encoded, at least in part, in the NMP; and transmit the response to the NMS.

In Example 23, the subject matter of Example 21 or 22 can optionally include the information identifying the apparatus and the port on the network interface on which the request was received being a first information; wherein the network interface being to receive the response to the impregnated request comprises the network interface being further to: receive, from the virtualization engine, an impregnated response to the impregnated request, the impregnated response comprising the response encoded in the NMP and having, within the response, second information identifying a port on the network interface on which to transmit the response, and wherein the second information is encoded in the service plane protocol; and wherein the network interface being to transmit the response to the NMS comprises the network interface being to transmit the response to the NMS on the port on the network interface on which to transmit the response.

Example 24 is a computer-readable non-transitory medium comprising instructions, that when executed by at least one processor configure the at least one processor to perform operations comprising: receiving a request from a network management system (NMS), wherein the request identifies a network element as a final destination of the request and is encoded in a network management protocol (NMP); unloading, to a virtualization engine, processes associated with communicating in the NMP by: converting the request to an impregnated request by inserting into the request information identifying the network element and an interface of the network element on which the request was received, wherein the information is encoded in a service plane protocol, and transmitting the impregnated request to the virtualization engine.

In Example 25, the subject matter of Example 24 can optionally include the operations further comprising: receiving, from the virtualization engine, a response to the impregnated request, the response being encoded, at least in part, in the NMP; and transmitting the response to the NMS.

In Example 26, the subject matter of Example 24 or 25 can optionally include the information identifying the network element and the interface of the network element on which the request was received being a first information, and can optionally include the receiving the response to the impregnated request comprising: receiving, from the virtualization engine, an impregnated response to the impregnated request, the impregnated response comprising the response encoded in the NMP and having, within the response, second information identifying an interface on which to transmit the response, and wherein the second information is encoded in the service plane protocol; and wherein the transmitting the response to the NMS comprises transmitting the response to the NMS on the interface on which to transmit the response.

Example 27 is a method comprising: receiving, by a virtualization engine, a request encoded in a network management protocol (NMP), wherein the request identifies a network element as a final destination of the request; controlling, by the virtualization engine on behalf of the network element, processes associated with communicating in the NMP by: identifying a data set based on an identifier identifying the network element, the data set being associated with generating a response to the request, accessing the data set from a memory element coupled to the network element, and executing, on the data set, an instance of a code block to generate the response, the instance of the code block operating on the data set to output the response encoded in the NMP.

In Example 28, the subject matter of Example 27 can optionally include converting the response to an impregnated response by inserting into the response information identifying an interface of the network element on which to transmit the response, wherein the information is encoded in a service plane protocol; and transmitting the impregnated response to the network element.

In Example 29, the subject matter of Example 27 or 28 can optionally include the information identifying the interface of the network element on which to transmit the response being a second information; wherein the receiving the request encoded in the NMP comprises: receiving an impregnated request, the impregnated request comprising a request encoded in the NMP and having, within the response, first information identifying the network element and an interface of the network element on which the request was received, and wherein the information is encoded in a service plane protocol; and wherein the first information comprises the identifier identifying the network element and an identifier identifying the interface of the network element on which the request was received.

In Example 30, the subject matter of any of Examples 27-29 can optionally include the code block implements the NMP and is operable to generate responses to requests that are encoded in the NMP, wherein the network element lacks the code block.

In Example 31, the subject matter of any of Examples 27-30 can optionally include, during the controlling the processes associated with communicating in the NMP, the virtualization engine retaining, on behalf of the network element, state information associated with the request.

In Example 32, the subject matter of any of Examples 27-31 can optionally include the NMP being a first NMP, and can optionally include: receiving, by the virtualization engine, an additional request from the NMS, wherein the request is encoded in a second NMP that is different from the first NMP, and wherein controlling processes associated with communicating in the second NMP comprises: executing, on the data set, an instance of a second code block to generate a second response, the instance of the second code block outputting the second response encoded in the second NMP.

In Example 33, the subject matter of any of Examples 27-32 can optionally include, prior to the controlling the processes associated with communicating in the NMP: converting the impregnated request to the request by parsing, from the impregnated request, the first information, and identifying the NMP in which to encode the response based on the first information.

In Example 34, the subject matter of any of Examples 27-33 can optionally include the first information being encoded in the service plane protocol comprising the first information being encoded into a first instance of a header defined by the service plane protocol and the second information being encoded in the service plane protocol comprises the second information being encoded into a second instance of the header defined by the service plane protocol.

In Example 35, the subject matter of any of Examples 27-34 can optionally include the header defined by the service plane protocol being a network service header defined by a service function chaining protocol; and wherein the first information being encoded into the first instance of the network service header defined by the service function chaining protocol comprises the first information being encoded into a field of the first instance of the network service header, and the second information being encoded into the second instance of the network service header defined by the service function chaining protocol comprises the second information being encoded into the field of the second instance of the network service header.

In Example 36, the subject matter of any of Examples 27-35 can optionally include the converting the response to the impregnated response by inserting into the response the second information identifying the identifier of the interface of the network element on which to transmit the response comprises: encoding, into the second instance of the header defined by the service plane protocol, the identifier of the interface of the network element on which to transmit the response; and inserting the second instance of the header defined by the service plane protocol into the response to generate the impregnated response.

In Example 37, the subject matter of any of Examples 27-36 can optionally include the request being encoded in the NMP comprising the request being encoded in an instance of a data structure of the NMP; and wherein the converting the request to the impregnated request by inserting into the request the first information comprises inserting the first information into the instance of the data structure to generate the impregnated request.

In Example 38, the subject matter of any of Examples 27-37 can optionally include the response being encoded in the NMP comprising the response being encoded in an instance of a data structure of the NMP; and wherein the impregnated response having, within the response, the second information identifying comprises the impregnated response having the second information within the instance of the data structure.

In Example 39, the subject matter of any of Examples 27-38 can optionally include the request and the response being encoded in a same NMP.

In Example 40, the subject matter of any of Examples 27-39 can optionally include the request and the response being encoded in a standardized network management protocol.

In Example 41, the subject matter of any of Examples 27-40 can optionally include the data structure of the NMP being one selected from the group consisting of a protocol data unit (PDU) of Simple Network Management Protocol (SNMP) and an Extensible Markup Language (XML) file of Network Configuration Protocol (NETCONF).

In Example 42, the subject matter of any of Examples 27-41 can optionally include the data structure of the NMP being one selected from the group consisting of a protocol data unit (PDU) of Simple Network Management Protocol (SNMP) and an Extensible Markup Language (XML) file of Network Configuration Protocol (NETCONF).

In Example 43, the subject matter of any of Examples 27-42 can optionally include, prior to the receiving the request: transmitting, by the virtualization engine to the network element, a unique identifier of the network element and a service function lookup data structure that associates one or more network management protocols (NMPs) with a corresponding one or more virtualization engines.

In Example 44, the subject matter of any of Examples 27-43 can optionally include the service function lookup data structure that associates the one or more NMPs with the corresponding one or more virtualization engines comprises: a first data structure portion storing a correspondence between: one or more identifiers associated with a corresponding one or more interfaces of the network element and a transport protocol, and the one or more NMPs; a second data structure portion storing the one or more NMPs and correspondence with one or more service functions; and a third data structure portion storing one or more service functions and correspondence with addresses of one or more virtualization engines that executes an instance of a corresponding service function.

In Example 45, the subject matter of any of Examples 27-44 can optionally include the receiving the request encoded in the NMP comprises receiving the request encoded in the NMP from the network element.

In Example 46, the subject matter of any of Examples 27-45 can optionally include the receiving the request encoded in the NMP comprises receiving the request encoded in the NMP from another virtualization engine.

In Example 47, the subject matter of any of Examples 27-46 can optionally include the virtualization engine being a network element.

In Example 48, the subject matter of any of Examples 27-47 can optionally include the accessing the data set from the memory element coupled to the network element comprising: converting the request to one or more lower level command that instructs network element to transmit at least a portion of the data set back to the virtualization element transmitting the one or more lower level command to network element; and receiving, based on the one or more lower level command, the data set from the network element.

In Example 49, the subject matter of any of Examples 27-48 can optionally include each of the one or more lower level command being selected from the group consisting of: a command directly executable by an operating system of the network element, a machine code directly executable by a hardware of the network element, and command line interfaces command.

In Example 50, the subject matter of any of Examples 27-49 can optionally include the accessing the data set from the memory element coupled to the network element comprises retrieving the data set from a database that is accessible by the network element and the virtualization engine.

Example 51 is an apparatus comprising: a network interface to receive a request encoded in a network management protocol (NMP), wherein the request identifies a network element as a final destination of the request; a memory element to store code comprising a code block; at least one processor coupled to the memory element and network interface, wherein the at least one processor is to execute the code to perform operations comprising: controlling, on behalf of the network element, processes associated with communicating in the NMP by: identifying a data set based on an identifier identifying the network element, the data set being associated with generating a response to the request, accessing the data set from a memory element coupled to the network element, and executing, on the data set, an instance of the code block to generate the response, the instance of the code block operating on the data set to output the response encoded in the NMP.

In Example 52, the subject matter of Example 51 can optionally include the operations further comprising: converting the response to an impregnated response by inserting into the response information identifying a port on the network interface on which to transmit the response, wherein the information is encoded in a service plane protocol; and wherein the network interface is further to transmit the impregnated response to the network element.

In Example 53, the subject matter of Example 51 or 52 can optionally include the information identifying the port on the network interface on which to transmit the response being a second information; and wherein the network interface being to receive the request encoded in the NMP comprises the network interface being further to: receive an impregnated request, the impregnated request comprising a request encoded in the NMP and having, within the response, first information identifying the network element and a port on the network interface on which the request was received, and wherein the information is encoded in a service plane protocol; and wherein the first information comprises the identifier identifying the network element and an identifier identifying the port on the network interface on which the request was received.

Example 54 is a computer-readable non-transitory medium comprising instructions, that when executed by at least one processor configure the at least one processor to perform operations comprising: receiving a request encoded in a network management protocol (NMP), wherein the request identifies a network element as a final destination of the request; controlling, on behalf of the network element, processes associated with communicating in the NMP by: identifying a data set based on an identifier identifying the network element, the data set being associated with generating a response to the request, accessing the data set from a memory element coupled to the network element, and executing, on the data set, an instance of a code block to generate the response, the instance of the code block operating on the data set to output the response encoded in the NMP.

In Example 55, the subject matter of Example 54 can optionally include the operations further comprising: converting the response to an impregnated response by inserting into the response information identifying an interface of the network element on which to transmit the response, wherein the information is encoded in a service plane protocol; and transmitting the impregnated response to the network element.

In Example 56, the subject matter of Example 54 or 55 can optionally include the information identifying the interface of the network element on which to transmit the response being a second information; wherein the receiving the request encoded in the NMP comprises: receiving an impregnated request, the impregnated request comprising a request encoded in the NMP and having, within the response, first information identifying the network element and an interface of the network element on which the request was received, and wherein the information is encoded in a service plane protocol; and wherein the first information comprises the identifier identifying the network element and an identifier identifying the interface of the network element on which the request was received.

Example 57 is a method comprising detecting, by a virtualization engine, a change in an operational state associated with a network element, wherein a network management protocol (NMP) identifies that a remote device is to be notified of the change in the operational state; and controlling, by the virtualization engine on behalf of the network element, processes associated with communicating in the NMP by: identifying, based on the change in operational state and the NMP, a data set associated with generating a message to notify the remote device of the change in the operational state; accessing the data set from a memory element coupled to the network element, and executing, on the data set, an instance of a code block to generate the message, the instance of the code block operating on the data set to output the message encoded in the NMP.

In Example 58, the subject matter of Example 57 can optionally include converting the message to an impregnated message by inserting into the message information identifying an interface of the network element on which to transmit the response, wherein the information is encoded in a service plane protocol; and transmitting the impregnated message to the network element.

In Example 59, the subject matter of Example 56 or 57 can optionally include the detecting comprising the network element sending a packet to the virtualization engine to alert the virtualization engine that the condition has occurred.

In Example 60, the subject matter of Example 56 or 57 can optionally include the detecting comprising the virtualization engine directly detecting the condition based on information in the memory element.

Example 61 is an apparatus comprising: a network interface coupled to a network element and configured to detect a change in an operational state associated with the network element, wherein a network management protocol (NMP) identifies that a remote device is to be notified of the change in the operational; a memory element to store code comprising a code block; at least one processor coupled to the memory element and network interface, wherein the at least one processor is to execute the code to perform operations comprising: controlling, on behalf of the network element, processes associated with communicating in the NMP by: identifying, based on the change in operational state and the NMP, a data set associated with generating a message to notify the remote device of the change in the operational state, accessing the data set from a memory element coupled to the network element, and executing, on the data set, an instance of a code block to generate the message, the instance of the code block operating on the data set to output the message encoded in the NMP.

In Example 62, the subject matter of Example 61 can optionally include converting the message to an impregnated message by inserting into the message information identifying an interface of the network element on which to transmit the response, wherein the information is encoded in a service plane protocol; and transmitting the impregnated message to the network element.

In Example 62, the subject matter of Example 61 or 62 can optionally include the detecting comprising the network element sending a packet to the virtualization engine to alert the virtualization engine that the condition has occurred.

In Example 63, the subject matter of Example 61 or 62 can optionally include the detecting comprising the virtualization engine directly detecting the condition based on information in the memory element.

Example 64 is a computer-readable non-transitory medium comprising instructions, that when executed by at least one processor configure the at least one processor to perform operations comprising: detecting a change in an operational state associated with a network element, wherein a network management protocol (NMP) identifies that a remote device is to be notified of the change in the operational state; and controlling, on behalf of the network element, processes associated with communicating in the NMP by: identifying, based on the change in operational state and the NMP, a data set associated with generating a message to notify the remote device of the change in the operational state; accessing the data set from a memory element coupled to the network element, and executing, on the data set, an instance of a code block to generate the message, the instance of the code block operating on the data set to output the message encoded in the NMP.

In Example 65, the subject matter of Example 64 can optionally include converting the message to an impregnated message by inserting into the message information identifying an interface of the network element on which to transmit the response, wherein the information is encoded in a service plane protocol; and transmitting the impregnated message to the network element.

In Example 66, the subject matter of Example 64 or 65 can optionally include the detecting comprising the network element sending a packet to the virtualization engine to alert the virtualization engine that the condition has occurred.

In Example 67, the subject matter of Example 64 or 65 can optionally include the detecting comprising the virtualization engine directly detecting the condition based on information in the memory element.

What is claimed is:

1. A method comprising:
    replacing a code block at a network element with instructions for Service Function Chaining (SFC);
    receiving, by the network element, a request from a network management system (NMS), the request identifying the network element as a final destination of the request and encoded, at least in part, in a network management protocol (NMP);
    converting the request to an impregnated request by inserting information into the request, the information encoded in a service plane protocol and identifying the network element and an interface of the network element on which the request was received; and
    transmitting the impregnated request to a virtualization engine, the virtualization engine being remote to the network element and containing the code block removed from the network element.

2. The method of claim 1, further comprising:
    receiving, from the virtualization engine, a response to the impregnated request, the response encoded, at least in part, in the NMP; and
    transmitting, by the network element, the response to the NMS.

3. The method of claim 2,
    wherein,
        the information is a first information,
        the interface is a first interface,
        the receiving of the response to the impregnated request includes receiving, from the virtualization engine, an impregnated response to the impregnated request,
        the impregnated response includes the response encoded in the NMP, the response including second information identifying a second interface on which to transmit the response, and, the second information is encoded in the service plane protocol, and the transmitting of the response to the NMS includes transmitting the response to the NMS on the second interface.

4. The method of claim 1,
wherein,
the code block implements the NMP and is operable to generate responses to requests encoded in the NMP, and
the virtualization engine is configured to execute at least one instance of the code block that implements the NMP.

5. The method of claim 1, further comprising:
receiving, by the network element, an additional request from the NMS,
wherein,
the NMP is a first NMP,
the additional request is encoded in a second NMP different from the first NMP, and
unloading processes associated with communicating in the second NMP requires no changes to operation of the network element.

6. The method of claim 5, wherein the unloading processes associated with communicating in the second NMP include unloading, by the network element to the virtualization engine, the processes associated with communicating in the second NMP being the same as the unloading, by the network element to the virtualization engine, the processes associated with communicating in the first NMP.

7. The method of claim 3, further comprising:
prior to the transmitting the response to the NMS on the interface on which to transmit the response, converting the impregnated response to the response by parsing, from the impregnated response, the second information and identifying, based on the second information, the interface on which to transmit the response.

8. The method of claim 3,
wherein,
the first information is encoded in the service plane protocol comprises the first information being encoded into a first instance of a header defined by the service plane protocol, and
the second information is encoded in the service plane protocol comprises the second information being encoded into a second instance of the header defined by the service plane protocol.

9. The method of claim 3,
wherein,
the request is encoded in the NMP comprises the request being encoded in an instance of a data structure of the NMP, and
the converting of the request to the impregnated request includes inserting the first information into the instance of the data structure to generate the impregnated request.

10. The method of claim 9, wherein the data structure of the NMP is a protocol data unit (PDU) of Simple Network Management Protocol (SNMP) or an Extensible Markup Language (XML) file of Network Configuration Protocol (NETCONF).

11. An apparatus comprising:
a network interface configured to receive, via a port, a request from a network management system (NMS), the request identifying the apparatus as a final destination of the request and encoded, at least in part, in a network management protocol (NMP);
a memory element configured to store code;
at least one processor coupled to the memory element and the network interface, the at least one processor configured to execute the code to perform operations comprising:
replacing a code block at the memory element with instructions for Service Function Chaining (SFC);
converting the request to an impregnated request by inserting information into the request, the information encoded in a service plane protocol and identifying the apparatus and the port; and
transmitting the impregnated request to a virtualization engine, the virtualization engine being remote to the memory element and containing the code block removed from the memory element.

12. The apparatus of claim 11, wherein the network interface is further configured to:
receive, from the virtualization engine, a response to the impregnated request, the response encoded, at least in part, in the NMP; and
transmit the response to the NMS.

13. The apparatus of claim 12,
wherein,
the information is a first information,
the port is a first port,
the network interface is configured to receive, from the virtualization engine, an impregnated response to the impregnated request,
the impregnated response includes the response encoded in the NMP,
the response includes second information identifying a second port on the network interface on which to transmit the response,
the second information is encoded in the service plane protocol, and
the network interface is configured to transmit the response to the NMS on the second port.

14. The apparatus of claim 11,
wherein,
the network interface is further configured to implement the NMP via the code block,
the code block is configured to generate responses to requests encoded in the NMP, and
the virtualization engine is configured to execute at least one instance of the code block.

15. The apparatus of claim 11,
wherein,
the NMP is a first NMP,
the network interface is further configured to receive an additional request from the NMS,
the request is encoded in a second NMP different from the first NMP, and
the at least one processor unloading processes associated with communicating in the second NMP requires no changes to operation of the unloading.

16. A computer-readable non-transitory medium comprising instructions, that when executed by at least one processor configure the at least one processor to perform operations comprising:
replacing a code block at the computer-readable non-transitory medium with instructions for Service Function Chaining (SFC);
receiving a request from a network management system (NMS), the request identifying a network element as a final destination of the request and encoded, at least in part, in a network management protocol (NMP);

converting the request to an impregnated request by inserting information into the request, the information identifying the network element and an interface of the network element on which the request was received and encoded in a service plane protocol;

transmitting the impregnated request to a virtualization engine, the virtualization engine being remote to the computer-readable non-transitory medium and containing the code block removed from the computer-readable non-transitory medium.

17. The computer-readable non-transitory medium of claim 16, wherein the operations further comprise:

receiving, from the virtualization engine, a response to the impregnated request, the response encoded, at least in part, in the NMP; and transmitting the response to the NMS.

18. The computer-readable non-transitory medium of claim 17,
wherein,
the information is a first information,
the interface is a first interface,
the receiving of the response to the impregnated request includes receiving, from the virtualization engine, an impregnated response to the impregnated request,
the impregnated response includes the response encoded in the NMP,
the response includes second information identifying a second interface on which to transmit the response,
the second information is encoded in the service plane protocol, and
the transmitting the response to the NMS includes transmitting the response to the NMS on the second interface.

19. The computer-readable non-transitory medium of claim 16,
wherein,
the code block is operable to generate responses to requests that are encoded in the NMP, and
the virtualization engine is configured to execute at least one instance of the code block.

20. The computer-readable non-transitory medium of claim 16,
wherein
the NMP is a first NMP,
the operations further include receiving an additional request from the NMS,
the request is encoded in a second NMP different from the first NMP, and
unloading processes associated with communicating in the second NMP requires no changes to the operations.

* * * * *